US012531351B2

(12) United States Patent
Odes

(10) Patent No.: US 12,531,351 B2
(45) Date of Patent: Jan. 20, 2026

(54) ULTRA WIDEBAND ANTENNA INCLUDING RADIO FREQUENCY BALUN

(71) Applicant: GM GLOBAL TECHNOLOGY OPERATIONS LLC, Detroit, MI (US)

(72) Inventor: Uriel Zvi Odes, Hamerkaz (IL)

( * ) Notice: Subject to any disclaimer, the term of this patent is extended or adjusted under 35 U.S.C. 154(b) by 152 days.

(21) Appl. No.: 18/373,633

(22) Filed: Sep. 27, 2023

(65) Prior Publication Data

US 2025/0105529 A1 Mar. 27, 2025

(51) Int. Cl.

*H01Q 1/32* (2006.01)
*H01Q 1/38* (2006.01)
*H01Q 13/10* (2006.01)
*H01Q 21/22* (2006.01)

(52) U.S. Cl.

CPC ............. *H01Q 21/22* (2013.01); *H01Q 13/10* (2013.01)

(58) Field of Classification Search

CPC .......... H01Q 1/32; H01Q 1/3275; H01Q 1/38; H01Q 13/10; H01Q 13/18; H01Q 21/22; H01Q 5/25

See application file for complete search history.

(56) References Cited

U.S. PATENT DOCUMENTS 6,914,573 B1 * 7/2005 McCorkle ............ H01Q 13/085
343/700 MS
7,408,513 B1 * 8/2008 Yanagi ..................... H01Q 9/40
343/702
7,545,339 B2 * 6/2009 Ratni ..................... H01Q 9/285
343/830
9,634,387 B2 * 4/2017 Cozzolino .............. H01Q 19/24
11,652,290 B2 * 5/2023 Odes ........................ H01Q 1/36
343/848
11,764,464 B2 * 9/2023 Odes ........................ H01Q 5/25
343/700 R
11,774,579 B1 * 10/2023 Wang .................... G01S 13/865
324/329
2025/0105507 A1 3/2025 Odes
2025/0105516 A1 3/2025 Odes

FOREIGN PATENT DOCUMENTS

DE 102016207434 A1 10/2017
DE 102022111245 A1 2/2023

OTHER PUBLICATIONS

Office Action dated May 14, 2024 from German Patent Office for German Patent No. 102023132320.2; 6pgs.

* cited by examiner

*Primary Examiner* — Tho G Phan

(57) ABSTRACT

An ultra wide band (UWB) antenna formed from a single piece of material includes: a planar portion arranged above a ground plane; an aperture through the planar portion; a ground connecting portion formed from cutting of the aperture and configured to electrically connect the UWB antenna to the ground plane; and a tapered portion configured to be electrically connected to a feed, the tapered portion extending around at least 40 percent of a periphery of the planar portion and extending from the planar portion toward the ground plane, where a height of the tapered portion decreases around the periphery of the planar portion moving away from the feed, and where a lower edge of the tapered portion is spaced from the ground plane by a gap.

20 Claims, 50 Drawing Sheets

FIG. 1A
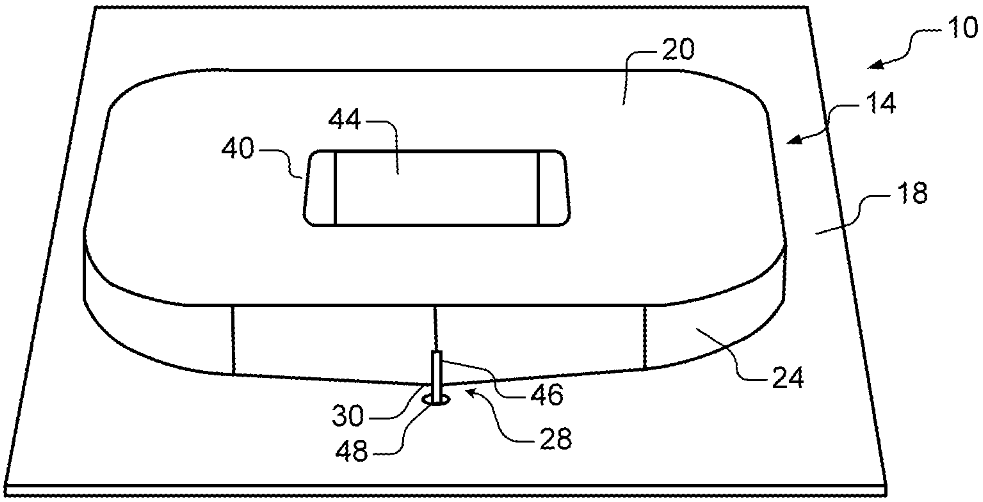
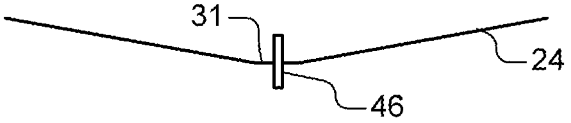
FIG. 1B
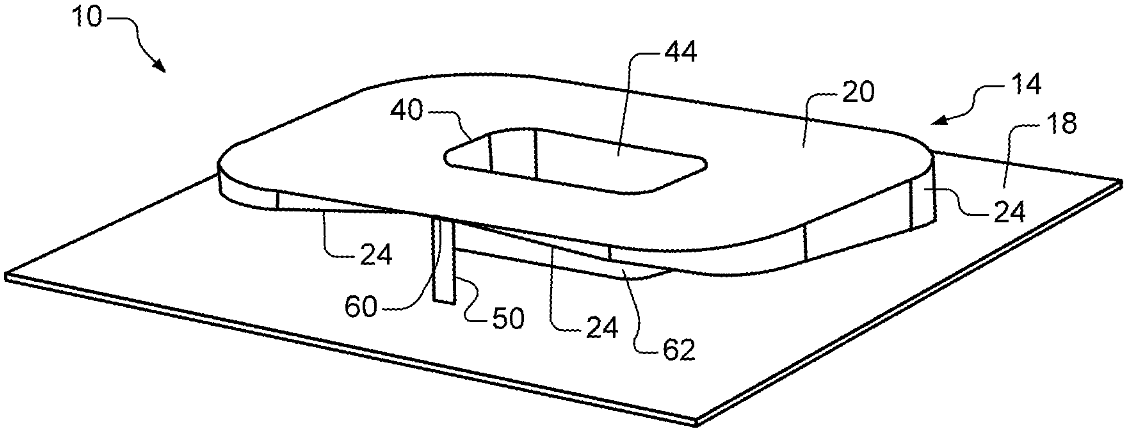
FIG. 2A

ULTRA WIDEBAND ANTENNA INCLUDING RADIO FREQUENCY BALUN

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to antennas and more particularly to ultra wide band antennas with radio frequency (RF) baluns.

Vehicles use telematics systems to support wireless telecommunications and information processing. Examples include cellular communications, global positioning system (GPS) navigation, integrated hands-free cell phones, wireless safety communication, vehicle to vehicle (V2V) communication, vehicle to infrastructure (V2I) communication, autonomous driving systems, etc.

The telematics systems transmit and receive data as the vehicle is driven on the road. To facilitate wireless connectivity, the vehicles include one or more antennas that are connected to transmitters and/or receivers of the telematics systems. Examples of antennas that may be used include mast antennas and shark fin antennas. Various sub-systems in the telematics systems transmit and receive on multiple different frequency bands. Ultra wide band (UWB) antennas may be a good candidate for cellular applications.

Manufacturers attempt to create cost-effective, fuel-efficient vehicles with attractive styling. Some antenna designs are typically not desirable from a styling viewpoint. For example, the shark fin antenna may be arranged on the roof of the vehicle above a middle of the rear windshield or on the rear deck lid. As can be appreciated, placing the shark fin antenna in those locations detracts from the external design of the vehicle. These types of antennas typically have a height that is approximately one quarter of a wavelength at a lowest desired operating frequency.

SUMMARY

In a feature, an ultra wide band (UWB) antenna formed from a single piece of material includes: a planar portion arranged above a ground plane; an aperture through the planar portion; a ground connecting portion formed from cutting of the aperture and configured to electrically connect the UWB antenna to the ground plane; and a tapered portion configured to be electrically connected to a feed, the tapered portion extending around at least 40 percent of a periphery of the planar portion and extending from the planar portion toward the ground plane, where a height of the tapered portion decreases around the periphery of the planar portion moving away from the feed, and where a lower edge of the tapered portion is spaced from the ground plane by a gap.

In further features, a radio frequency (RF) balun is included.

In further features, the aperture is disposed closer to where the RF balun than a location of an end of the tapered portion.

In further features, a first width of the aperture is within a predetermined percentage of a second width of the planar portion.

In further features, the predetermined percentage is 25-60 percent.

In further features, the predetermined percentage is 30-55 percent.

In further features, the ground connecting portion includes an edge where the ground connecting portion is folded away from the planar portion and toward the ground plane.

In further features, a radio frequency (RF) balun is included, where an angle between (a) the edge where the ground connecting portion is folded away from the planar portion and toward the ground plane and (b) a second edge of the planar portion adjacent to the RF balun is within a predetermined angle range.

In further features, the predetermined angle range is 90 to 165 degrees.

In further features, the predetermined angle range is 130 to 160 degrees.

In further features, the tapered portion extends toward the ground plane and is perpendicular to the ground plane and the planar portion.

In further features, the tapered portion extends toward the ground and is non-perpendicular to the ground plane and the planar portion.

In further features, at least one of the ground connecting portion and the tapered portion is 3 to 10 degrees from being perpendicular to the planar portion and the ground plane.

In further features: a radio frequency (RF) balun is included; and a slot disposed between the RF balun and the planar portion is included.

In further features, the slot is disposed between the RF balun and the aperture.

In further features, a second slot disposed on an opposite side of the planar portion as the slot is included.

In further features, the height of UWB antenna corresponds to approximately 1/20 of a wavelength corresponding to a target lowest operating frequency of the UWB antenna.

In further features, the height of the tapered portion monotonically decreases moving away from the feed.

In further features, the planar portion, the ground connecting portion, and the tapered portion are made of an electrically conductive material.

In further features, a vehicle includes the UWB antenna.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a perspective view of a feed side of an example of an ultra wide band (UWB) antenna arranged above a ground plane according to the present disclosure;

FIG. 1B is a side view illustrating another example of the tapered side portion near the feed point according to the present disclosure;

FIGS. 2A to 2C are perspective views of examples of a back side of the UWB antenna of FIGS. 1A and 1B;

In the drawings, reference numbers may be reused to identify similar and/or identical elements.

DETAILED DESCRIPTION

Figure 2B:
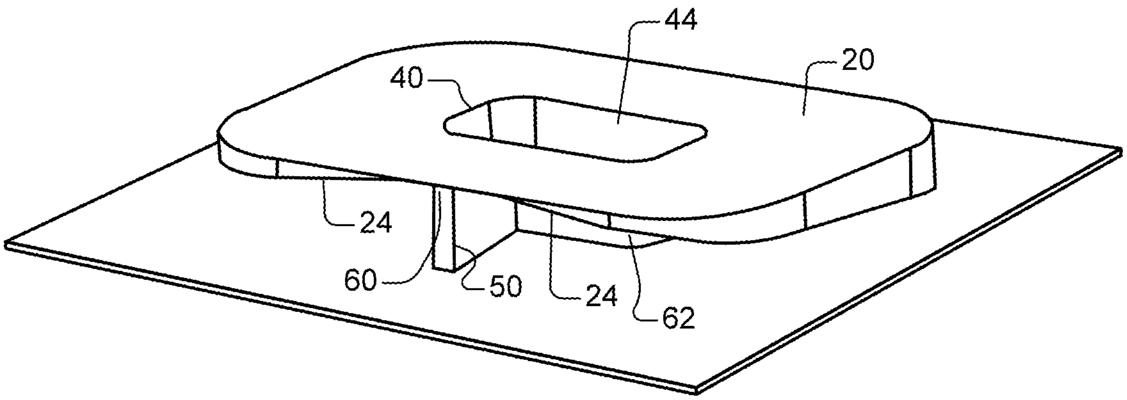

An ultra wide band (UWB) antenna according to the present disclosure has an extremely low profile, which allows the UWB antenna to be incorporated into a variety of different locations. The extremely low profile allows the UWB antenna to be placed in less noticeable internal or external vehicle locations. For example, the UWB antenna can be concealed in a cavity in the roof below a non-conducting roof material and above a conducting plane (which may be the same as or different than the ground plane of the antenna), which improves the exterior design of the vehicle. Other example locations for the UWB antenna may be inside a spoiler of a vehicle, near (e.g., above or below) a rear windshield of the vehicle, or a top or bottom portion near an edge of the frame. The UWB antennas of the present application described herein include radio frequency (RF) baluns (balance to unbalanced devices) that aid in tuning the UWB antennas.

Referring now to FIGS. 1A to 2C, an example UWB antenna 10 is shown. In FIG. 1A, the UWB antenna 10 includes an antenna body 14 that is arranged above a ground plane 18. Somewhat different than the examples discussed further below, the antenna body 14 includes a planar portion 20 and a tapered side portion 24 that extends from a bottom surface of the planar portion 20 towards the ground plane 18. In some examples, the planar portion 20 has a rounded rectangular shape, an elliptical shape or a circular shape.

In some examples, an opening 40 is formed in the planar portion 20 and has a shape that is similar to a shape of the outer edge of the planar portion 20, although other shapes can be used. For example, the opening 40 may have a rounded rectangular shape, an elliptical shape or a circular shape.

In some examples, the opening 40 is centered relative to the planar portion 20 (e.g., vertically and horizontally between opposite sides). If the opening 40 is used, an upper edge of a cylinder 44 is connected to a bottom surface of the planar portion 20 at the opening 40 and a lower edge of the cylinder 44 is connected to the ground plane 18. In other examples, the opening 40 can be omitted. If the opening 40 is omitted, a top portion of the cylinder 44 can be attached to a bottom surface of the planar portion 20.

In some examples, the cylinder 44 is a rounded rectangular cylinder, an elliptical cylinder or a circular cylinder. In some examples, the cross-sectional shape and size of the cylinder 44 matches a shape of the opening 40. The cylinder 44 is connected to the bottom surface of the planar portion 20 along an edge of the opening 40 or radially outside of the opening 40 to provide electrical continuity between the planar portion 20 and the cylinder 40.

In some examples, the tapered side portion 24 is connected at or near the outer edge of the planar portion 20 and wraps fully around the outer edge of the planar portion 20. In other examples, the tapered side portion 24 is connected at or near the outer edge of the planar portion 20 and wraps around greater than or equal to 90% of the edge of the planar portion 20. In still other examples, the tapered side portion 24 wraps around at least 50% of the outer edge of the planar portion (or at least 25% at or near the outer edge of the planar portion in both directions when starting from the antenna feed on the feed side).

The tapered side portion 24 has a height that varies around the outer edge of the planar portion 20. In the example of FIG. 1A, the height of the tapered side portion 24 decreases or tapers from a center 30 of the tapered side portion 24 on the feed side shown in FIG. 1A (where the tapered side portion 24 has its greatest height) to a location at or near a center 60 of the tapered side portion 24 on the back side shown in FIG. 2A (where the tapered side portion 24 has its shortest height). In other words, the gap between the lower edge of the tapered side portion 24 and the ground plane 18 varies. A vertical height of the gap increases from the center 30 of the tapered side portion 24 on the feed side shown in FIG. 1A to a location at or near the center 60 of the tapered side portion 24 on the back side shown in FIG. 2A where the gap has a largest vertical height.

Figure 2C:
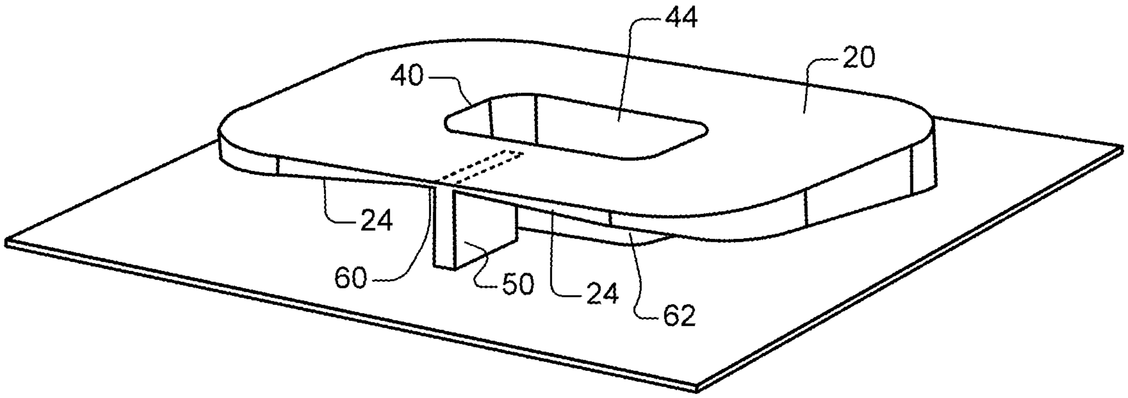

In some examples, the height of the tapered side portion 24 tapers fully at the center 60 as shown in FIG. 2A. In other examples, the tapered side portion 24 does not taper fully at the center as shown in FIG. 2C. Alternatively, the tapered side portion 24 tapers from a center 30 on the feed side shown in FIG. 1 and ends prior to reaching the center 60 as shown in FIG. 2B. In some examples, the height of the tapered side portion 24 monotonically decreases.

The antenna body 14 is mounted to the ground plane 18 and a gap 28 is defined between the center 30 of the tapered side portion 24 on the feed side and the ground plane 18. In some examples, an antenna feed 46 extends through an opening 48 formed in the ground plane 18 and is connected to the antenna body 14 at the center 30 of the feed side. For example only, the antenna feed 46 can include an inner conductor of a coaxial cable and a woven copper shield (not shown) of the coaxial cable can be connected to the ground plane 18. The inner conductor of the coaxial cable may serve as the antenna feed 46 and be electrically connected to the antenna body 14. While a specific type of antenna feed is shown for illustration purposes, the antenna can be fed using other antenna feed arrangements. For example, rather than passing perpendicular through the ground plane, the antenna feed can be arranged and connected to the antenna body at the feed location parallel to and above the ground plane (and not pass through the ground plane).

In FIG. 1B, the tapered side portion 24 can optionally taper downwardly adjacent to the feed location and then transition to a non-tapered section 31 at the antenna feed location. In some examples, a transition between the tapered side portion 24 and the non-tapered section 31 can be rounded. In some examples, a lower edge of the non-tapered section 31 is arranged parallel to the ground plane. In some examples, the non-tapered section 31 has a horizontal width in range from 0.5 mm to 20 mm, although other widths may be used. The horizontal width of the non-tapered section 31 and the height of the gap 28 can be varied to influence the impedance of the UWB antenna at the antenna feed point.

The planar portion 20 lies in a plane that is generally parallel to and spaced above the ground plane 18. A connecting portion 50 is located on a back side of the antenna body 14 to connect the planar portion 20 and/or the tapered side portion 24 to the ground plane 18. In some examples, the connecting portion 50 includes a conducting portion that connects the planar portion 20 to the ground plane 18 but does not extend to the cylinder 44 (FIG. 2A). In other examples, the connecting portion 50 includes a conducting wall portion having a generally rectangular cross-section (in a radial direction of the planar portion 20). If the conducting wall is used, the connecting portion 50 is attached to a lower surface of the planar portion 20 near the center 60 of the planar portion 20 and extends fully (in FIG. 2B) or partially (FIG. 2C) to an outer surface 62 of the cylinder 44.

The antenna body 14 can be made entirely of an electrically conductive material such as a metal. Alternately, one or more portions of the antenna body 14 can include a supporting surface that is made of a non-conducting material and a layer made of a conducting material attached to, deposited on, or printed on the non-conducting material.

Without committing to a theory of operation, the UWB antennas described herein operate like a cavity-backed slotted antenna with opposite ends and the cavity wrapped around and connected together.

Some antenna designs may involve a height of the UWB antenna to be at least approximately one quarter (¼) of the wavelength corresponding to a lowest target operating frequency of the UWB antenna 10. In some examples, the UWB antennas discussed herein can be designed with a vertical height that is as low as approximately $\frac{1}{20}$th of a wavelength corresponding to the lowest target operating frequency. As used herein, approximately $\frac{1}{20}$th of a wavelength may refer to 4% to 6% of the wavelength corresponding to the lowest desired operating frequency. When height is less of a concern, the UWB antenna 10 can be designed with other vertical heights such as $\frac{1}{10}$th of a wavelength corresponding to the lowest target operating frequency or other heights. Vertical height may refer to the distance between the ground plane and the vertical top most portion of the UWB antenna.

For example, the UWB antenna can be designed for 1.7 GHZ applications and can have a height of approximately 8-9 millimeters (mm). In some examples, the width W and length L of the UWB antenna is in a range from 0.5 to 5 times the height H of the UWB antenna. In some examples, the ground plane is wider than the L and W of the antenna body by first and second predetermined distances, respectively. The first and second predetermined distances are the same (symmetric) or different (asymmetric).

The UWB antenna 10 has a low profile. The relatively low height of the UWB antenna (e.g. approximately $\frac{1}{20}$*wavelength) provides a significant advantage when attempting to locate the UWB antenna in unobtrusive locations to enhance the design and visual appearance of the vehicle. The increased height of other antennas makes it more difficult to locate in or on a vehicle without adversely impacting the design of the vehicle or reducing headroom when located between the headliner and roof.

For example only, the UWB antenna 10 may be designed for 617 megahertz (MHz) applications and can handle a first frequency band from 617 MHz to 960 MHZ, a second frequency band from 1.7 gigahertz (GHz) to 2.7 GHZ and a third frequency band from 3.3 GHz to 6 GHZ, although other frequencies ranges may be used.

In the UWB antenna 10 shown in FIGS. 1A to 2C, the UWB antenna 10 is arranged above the ground plane 18. In this design, the ground plane 18 may act similar to a mirror and reflect signals emitted by the UWB antenna 10.

Figures 3A, 3B, 3C:
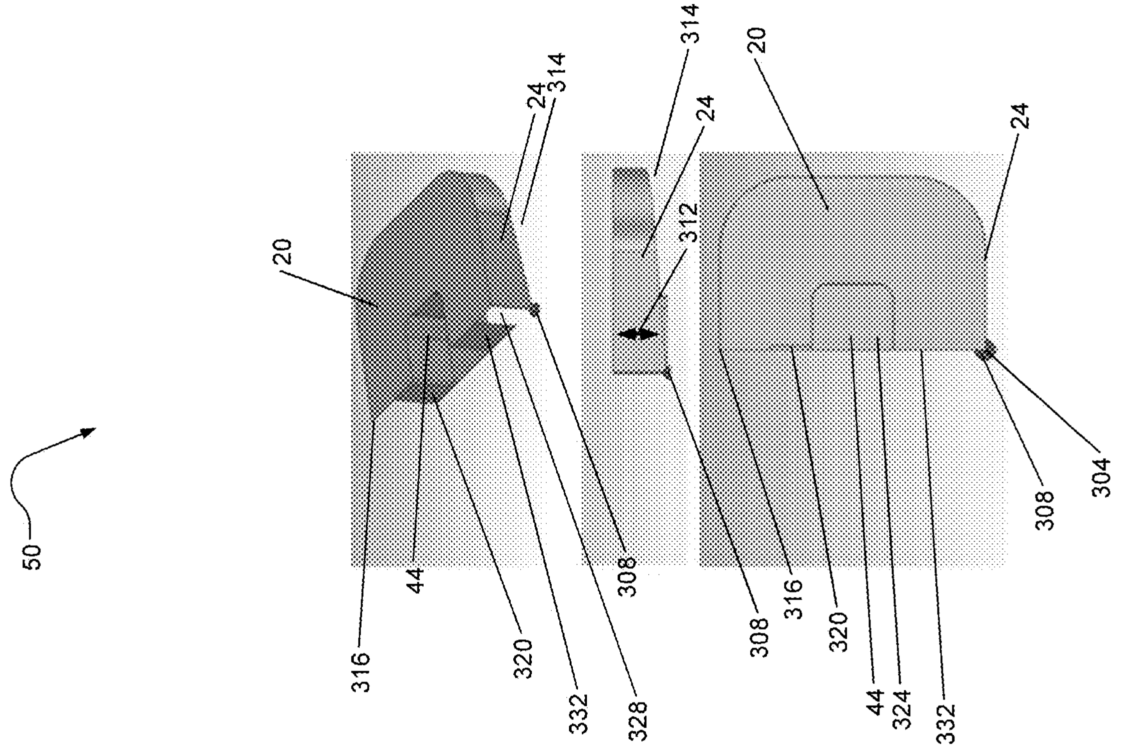
FIGS. 3A-3C include perspective views of an example UWB antenna including a radio frequency (RF) balun.

FIGS. 3A-3C include perspective views of an example UWB antenna. The UWB antenna of FIGS. 3A-3C are approximately half of the size (volume) of the UWB antenna discussed above. FIG. 3A is a top side perspective view. FIG. 3B is a side perspective view. FIG. 3C is a top perspective view.

The UWB antenna of FIGS. 3A-3C may be about one half of the UWB antennas of FIGS. 1A-2C if cut along a line connecting the feed 46 and the connecting portion 50.

In the example of FIGS. 3A-3C, a feed 304 is connected to a first point of the tapered side portion 24. The feed 304 is connected to the tapered side portion 24 via a capacitor 308 or another suitable type of filter. The tapered side portion 24 is tapered decreases in height 312 moving around the periphery of the UWB antenna. The height 312 may decrease monotonically between the first point and an end point 316 of the tapered side portion 24. In this example, the tapered side portion 24 extends around three sides of the UWB antenna. As the tapered side portion 324 decreases in height, the gap 314 between the lower edge of the tapered side portion 24 and the ground plane increases.

The fourth side of the UWB antenna is planar. A ground connecting portion 320 is located on the fourth side along the plane and extends (e.g., perpendicularly) from the planar cap portion 20 to the ground plane. The ground connecting portion 320 electrically connects the UWB antenna to the ground plane. A planar bottom 324 of the cylindrical portion may also contact the ground plane and electrically connect the UWB antenna to the ground plane.

An RF balun 328 is also located on the fourth side along the plane and extends between the planar cap portion 20 and the ground plane. A second connecting portion 332 is also located on the fourth side along the plane and extends (e.g., perpendicularly) from the planar cap portion 20 toward or to and the ground plane. The second connecting portion 332 may electrically connect the UWB antenna to the ground plane. Air may be present within the RF balun 328. The RF balun 328 provides a high impedance area (balanced line to unbalanced line (balun)). The RF balun 328 helps to tune the antenna and to balance 328 the impedance of the antenna with the impedance of the (cable of the) feed 304 which may be, for example, a coaxial cable.

The RF balun 328 may be rectangular as illustrated in FIG. 3A. However, the RF balun may also be another suitable shape, such as circular, ovular, triangular, hexagonal, pentagonal, etc.

Figure 4:
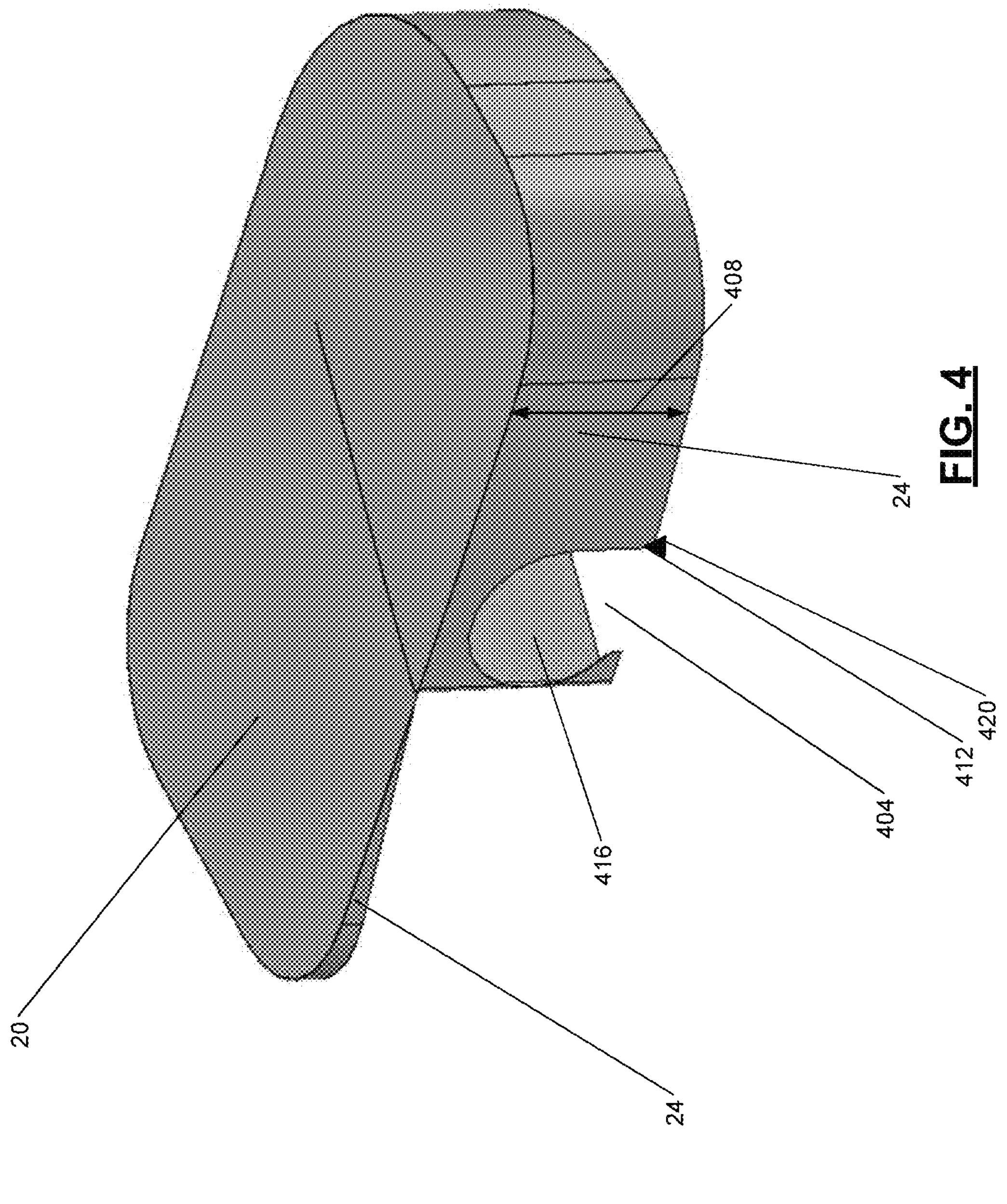
FIGS. 4-10 include perspective views of an example UWB antenna with a rounded RF balun.
Figure 5:
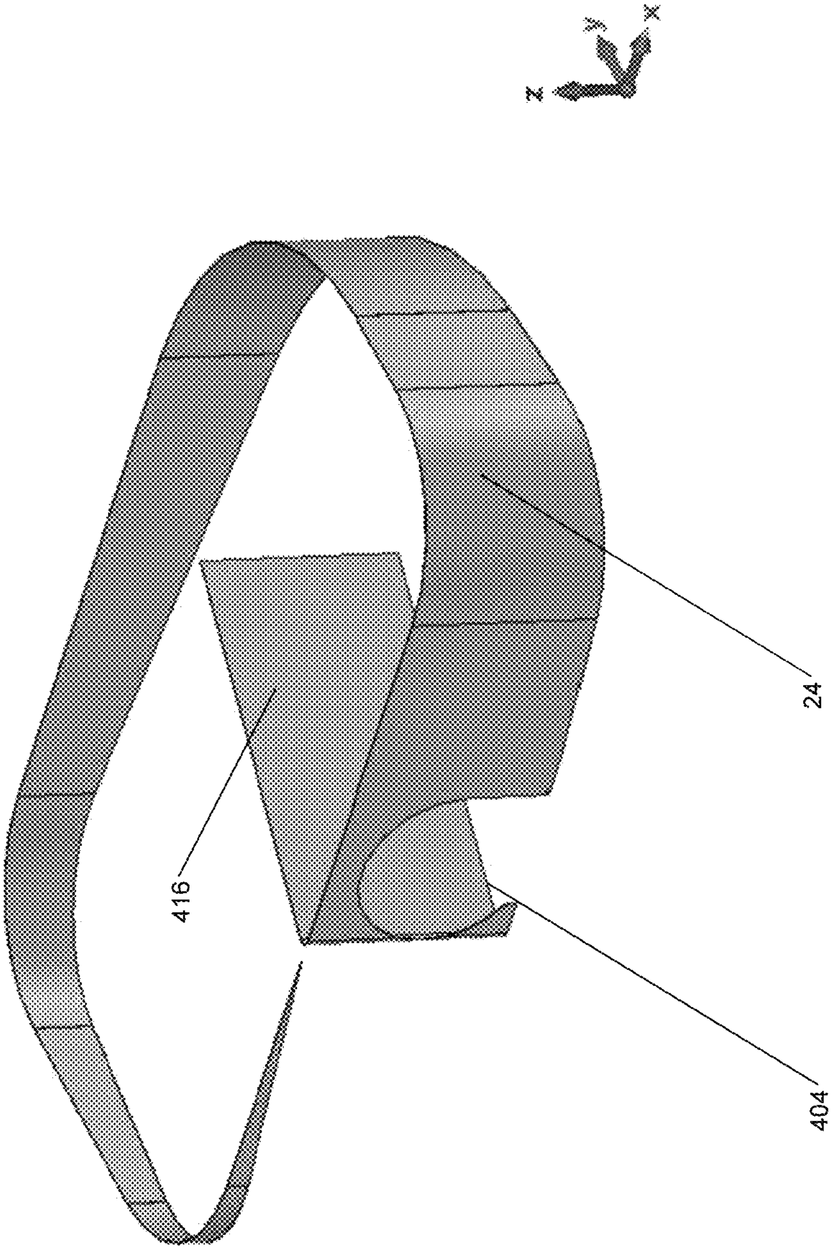
Figure 6:
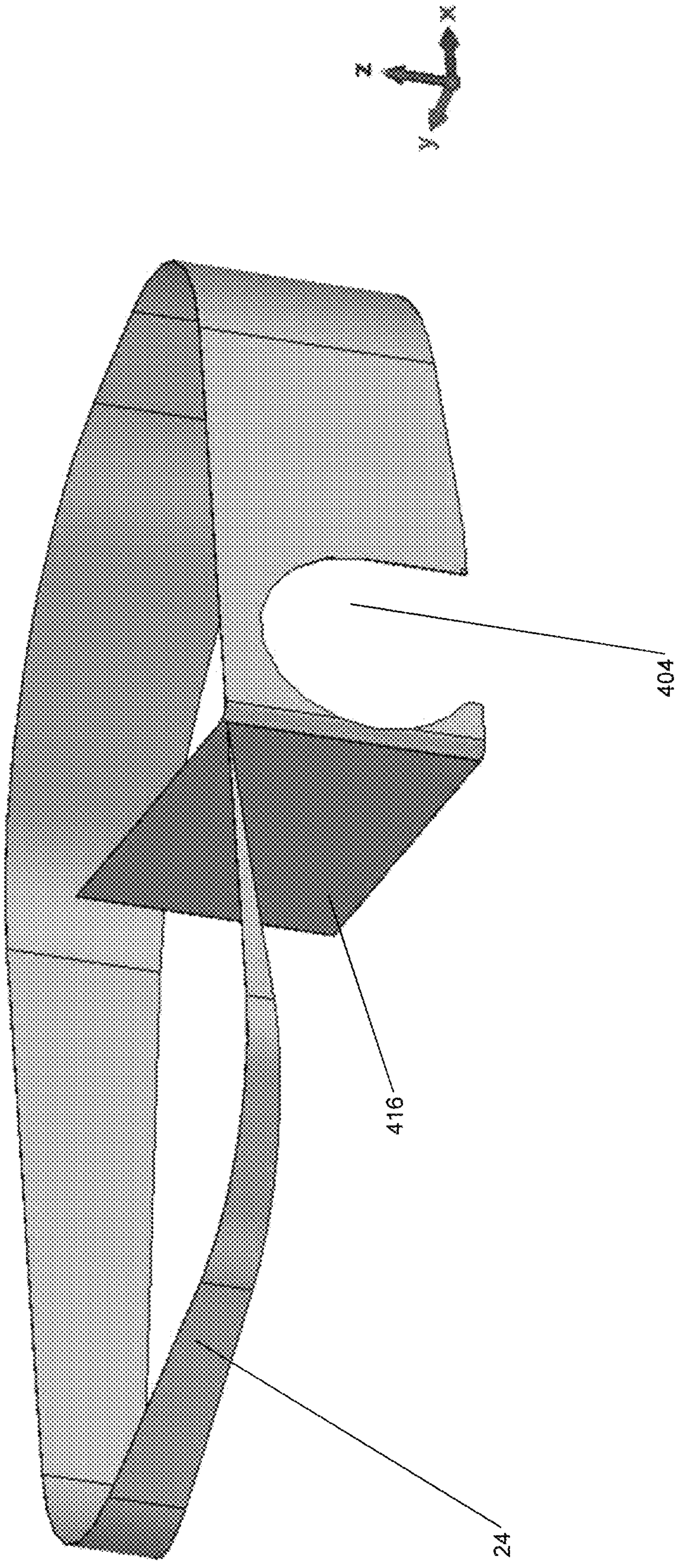
Figure 7:
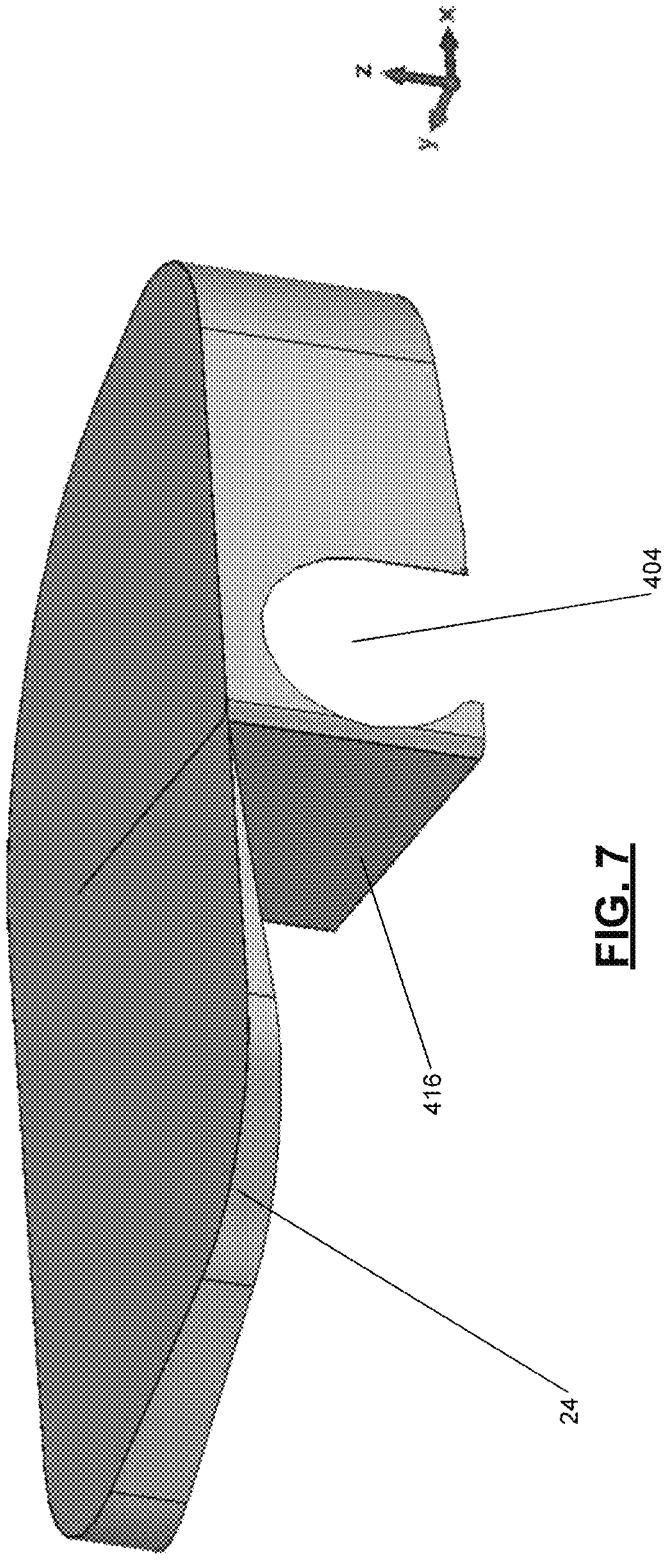
Figure 8:
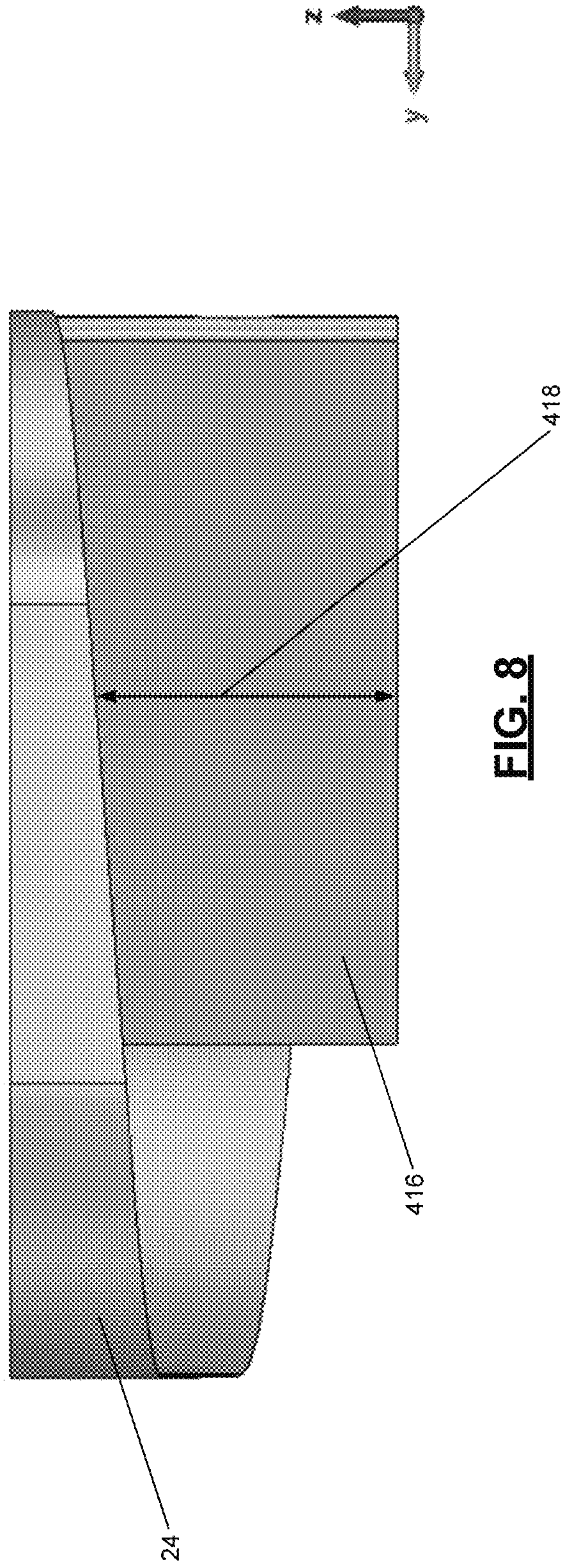
Figure 9:
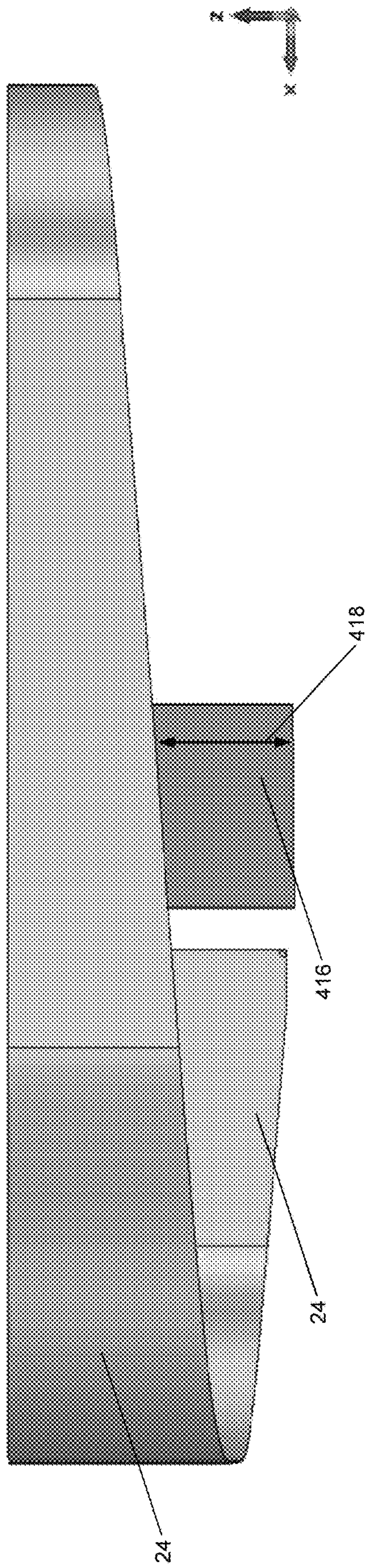
Figure 10:
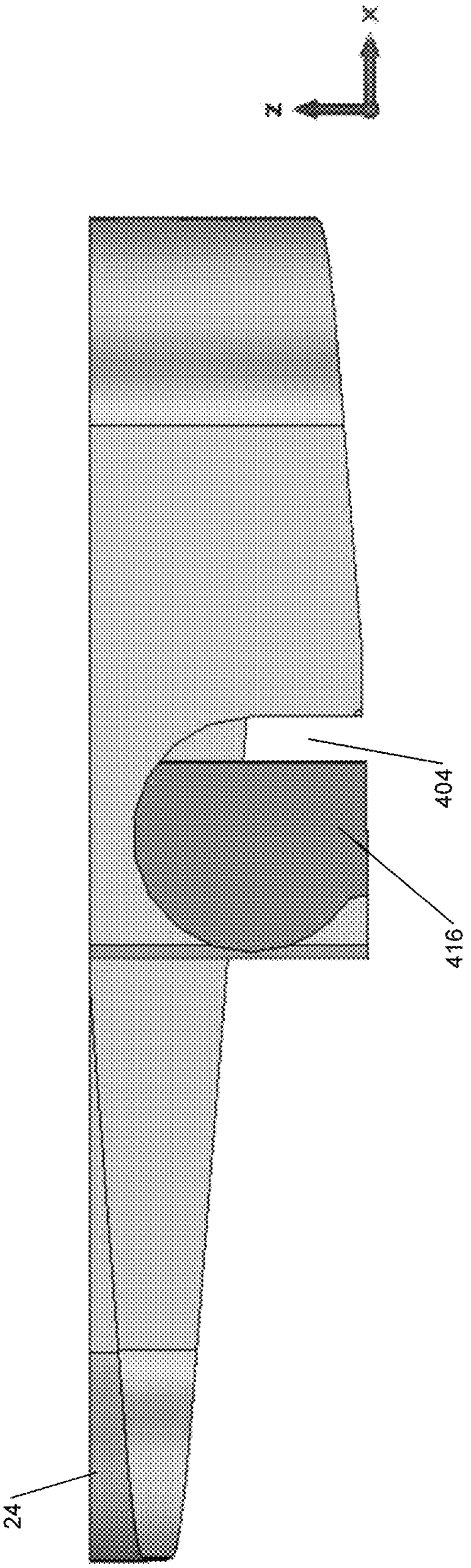

For example, FIGS. 4-10 include perspective views of an example UWB antenna with a rounded (e.g., circular) RF balun 404. FIG. 4 is a top side perspective view of the UWB antenna showing the planar cap portion 20. FIG. 5 is a top side perspective view of the UWB antenna with the planar cap portion 20 removed. FIG. 6 is another top side perspective view of the UWB antenna with the planar cap portion 20 removed. FIG. 7 is a top side perspective view of the UWB antenna of FIG. 6 showing the planar cap portion 20. FIG. 8 is a left side perspective view of the UWB antenna. FIG. 9 is a rear perspective view of the UWB antenna. FIG. 10 is a front perspective view of the UWB antenna.

The example of FIGS. 4-10 illustrates the tapered side portion 24 decreasing in height 408 continuously (e.g., monotonically) around the outer edges of the UWB antenna from (a) where feed 412 connects to (b) ground connecting portion 416. The ground connecting portion 416 electrically connects the UWB antenna to the ground plane. Because the tapered side portion 24 decreases in height, the gap 418 continuously (e.g., monotonically) increases around the outer edges of the UWB antenna from (a) where feed 412 connects to (b) the ground connecting portion 416.

Figure 11:
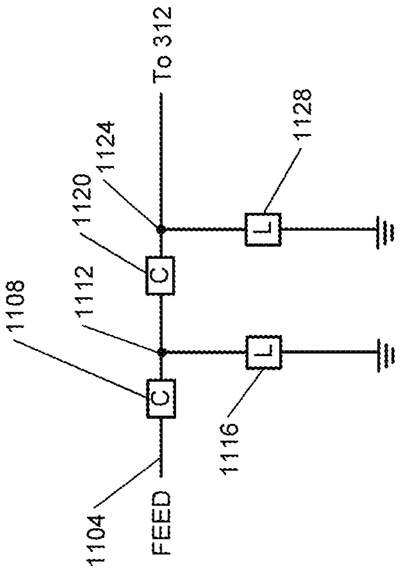
FIG. 11 is a functional block diagram of an example implementation of the matching network.

The UWB antennas discussed herein may be connected to their respective feeds by a matching network 420. The matching network 420 may include, for example, one or more capacitors, inductors, and/or resistors. FIG. 11 is a functional block diagram of an example implementation of the matching network. A first end 1104 is electrically connected to the feed conductor, such as of a coaxial cable.

A capacitor 1108 may be connected between the first end 1104 and a first node 1112. An inductor 1116 may be connected between the first node 1112 and a ground potential, such as the ground plane. A capacitor 1120 may be connected between the first node 1112 and a second node 1124. An inductor 1128 may be connected between the second node 1124 and the ground potential, such as the ground plane. The second node 1124 is connected to the feed connection point of the UWB antenna.

FIGS. 12-20 include perspective views of an example UWB antenna with a rectangular RF balun 1204 and non-rounded corners. A matching network may be included with or omitted from any of the UWB antennas discussed herein. For example, a matching network may not be included with the example UWB antenna of FIGS. 12-20.

Figure 12:
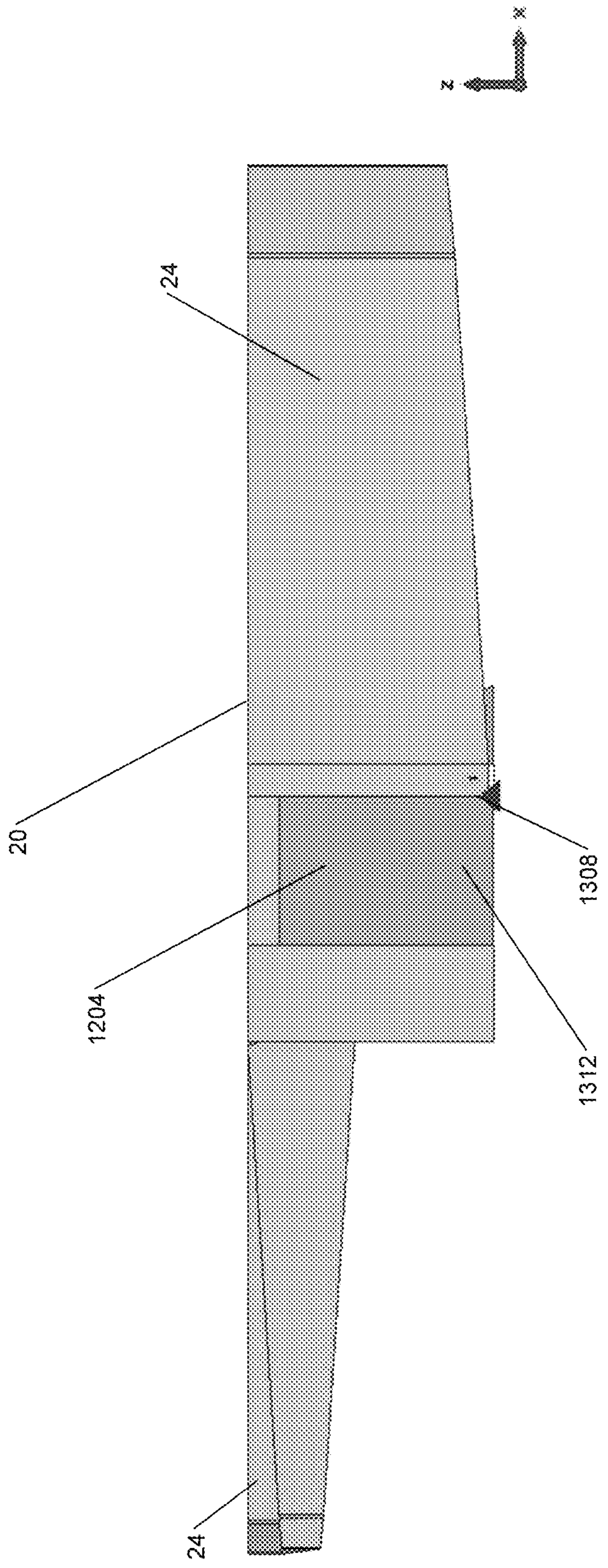
FIGS. 12-20 include perspective views of an example UWB antenna with a rectangular RF balun and non-rounded corners.
Figure 13:
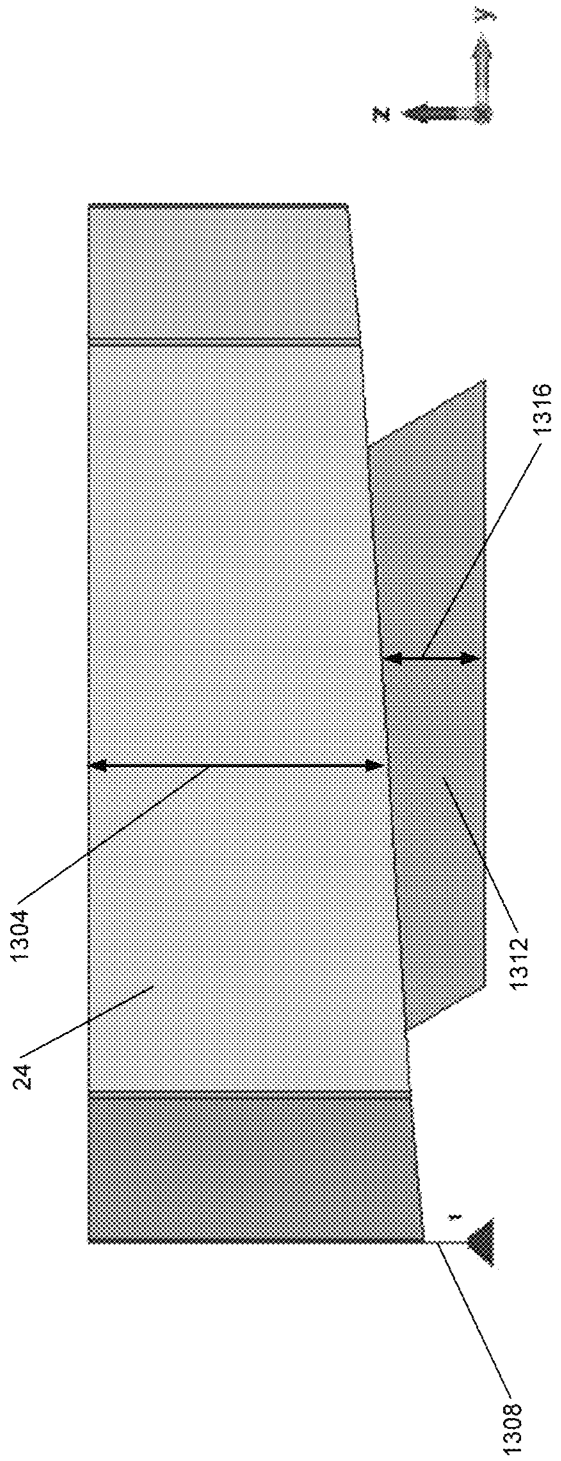
Figure 14:
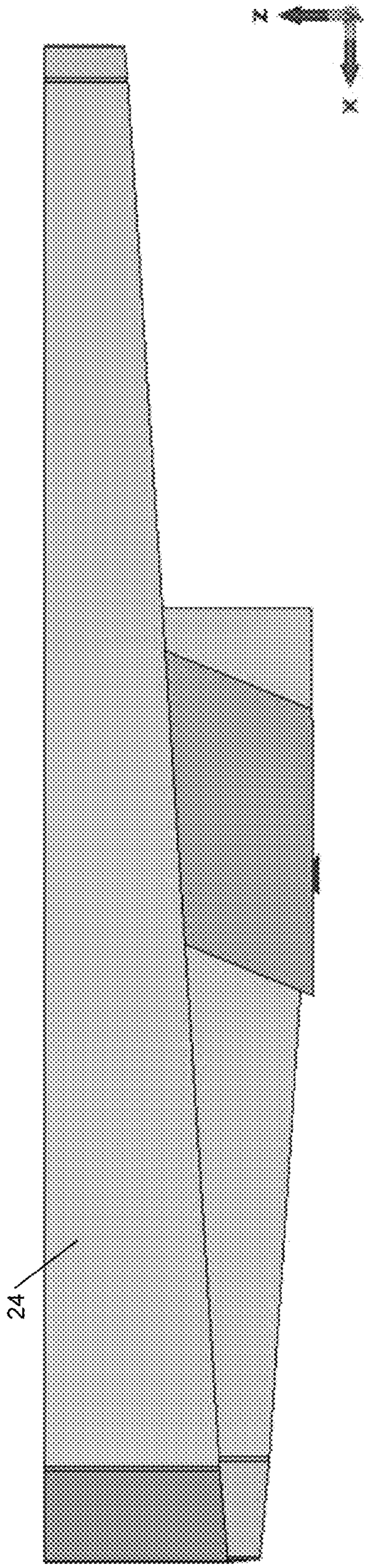
Figure 15:
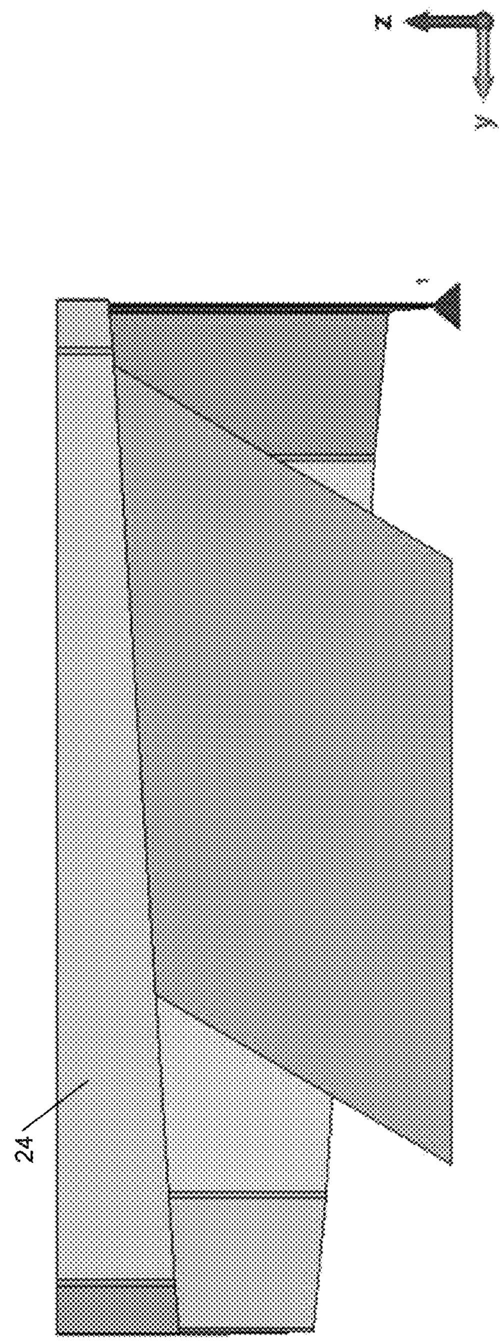
Figure 16:
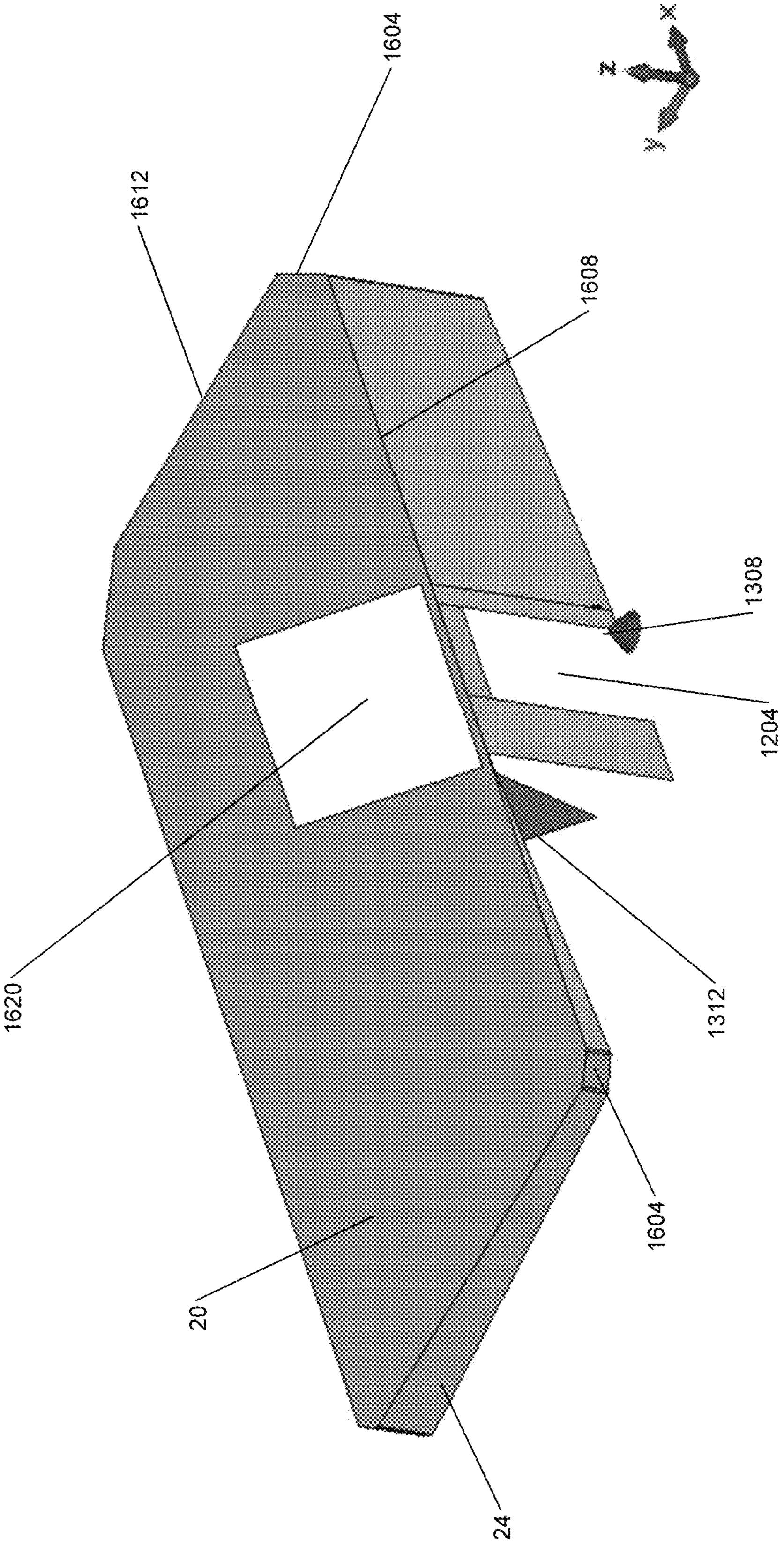
Figure 17:
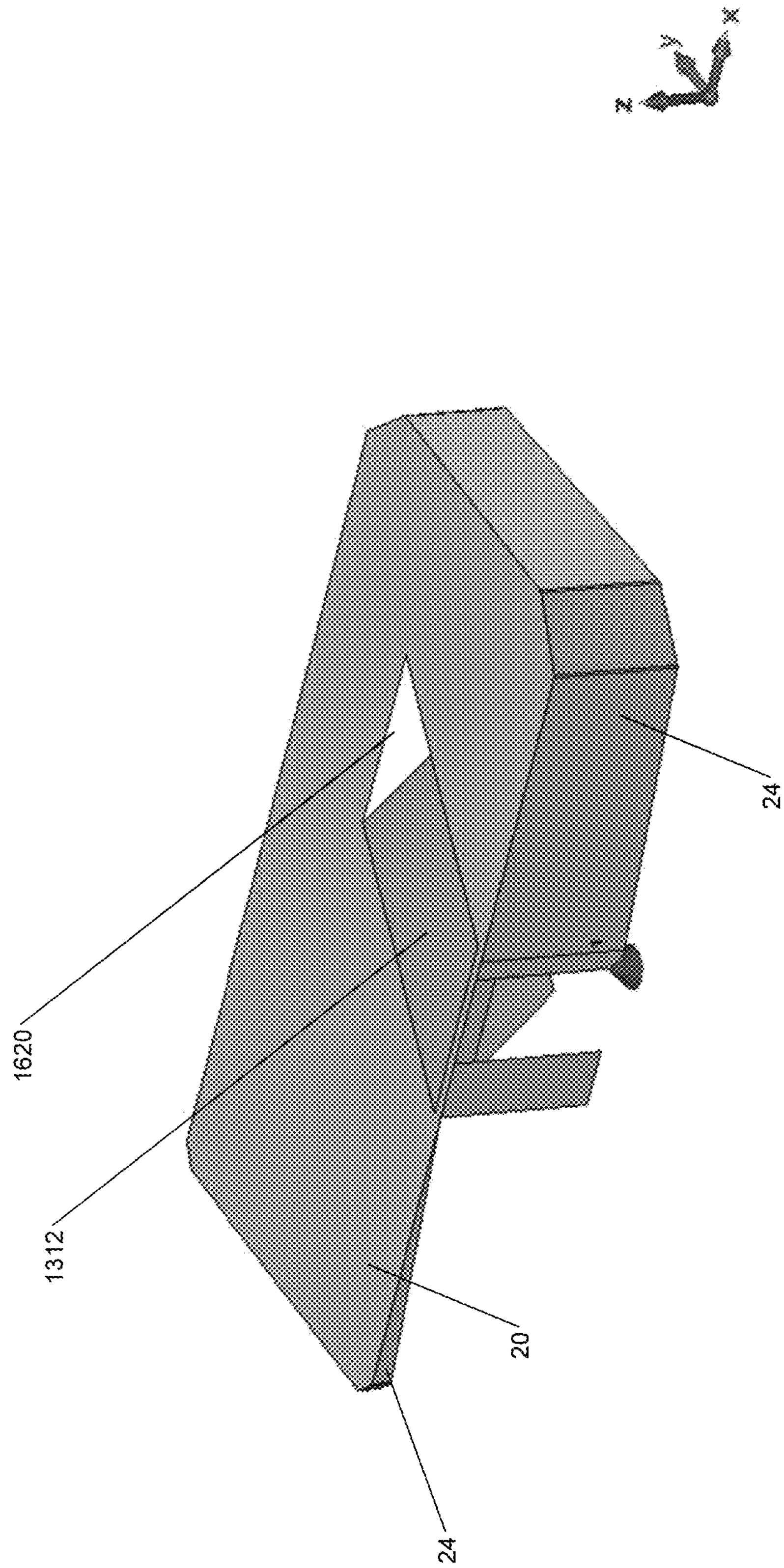
Figure 18:
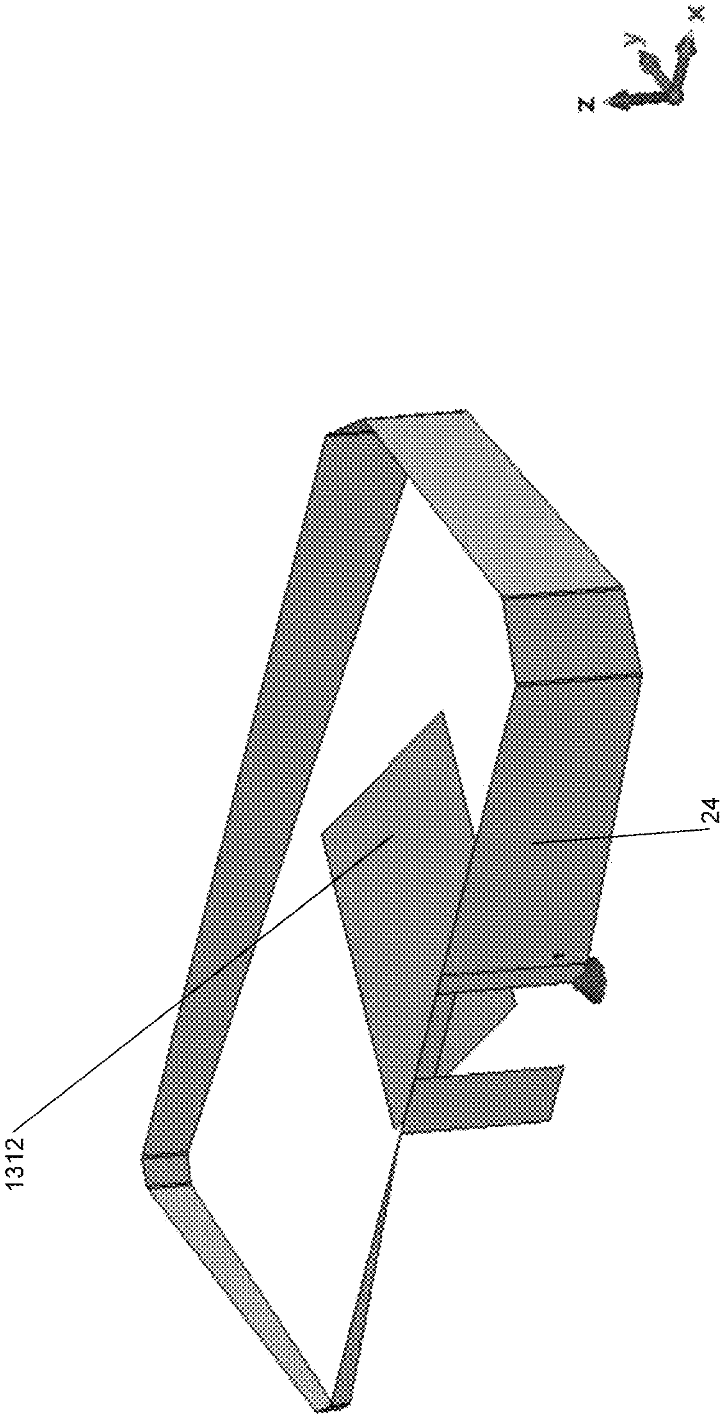
Figure 19:
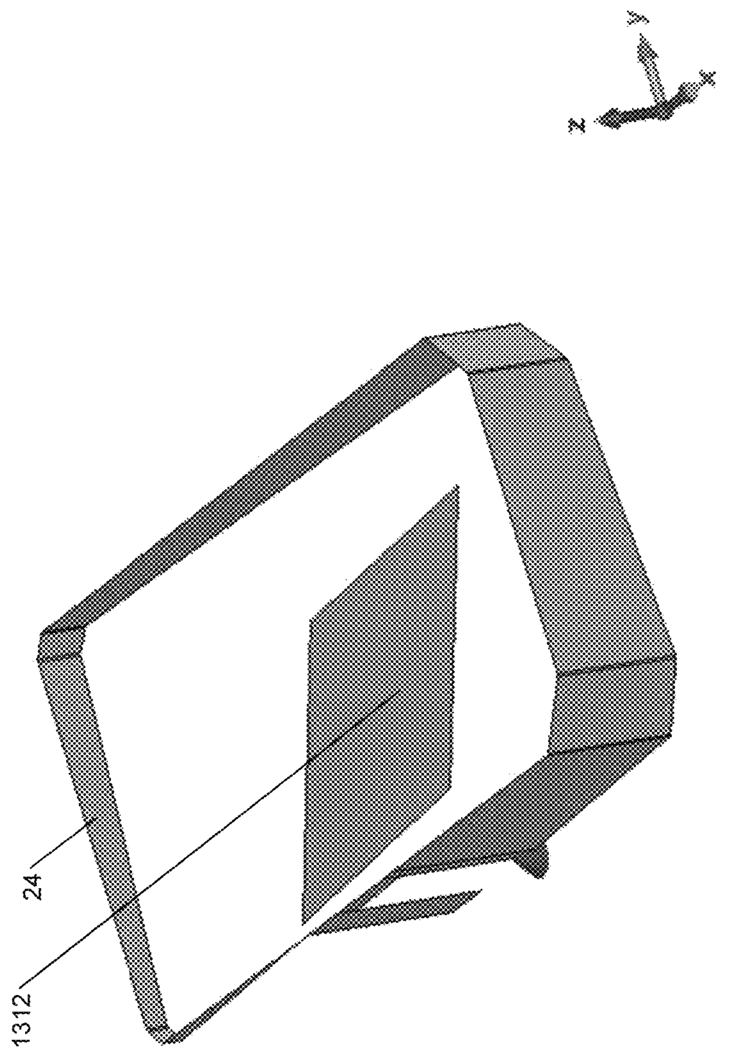
Figure 20:
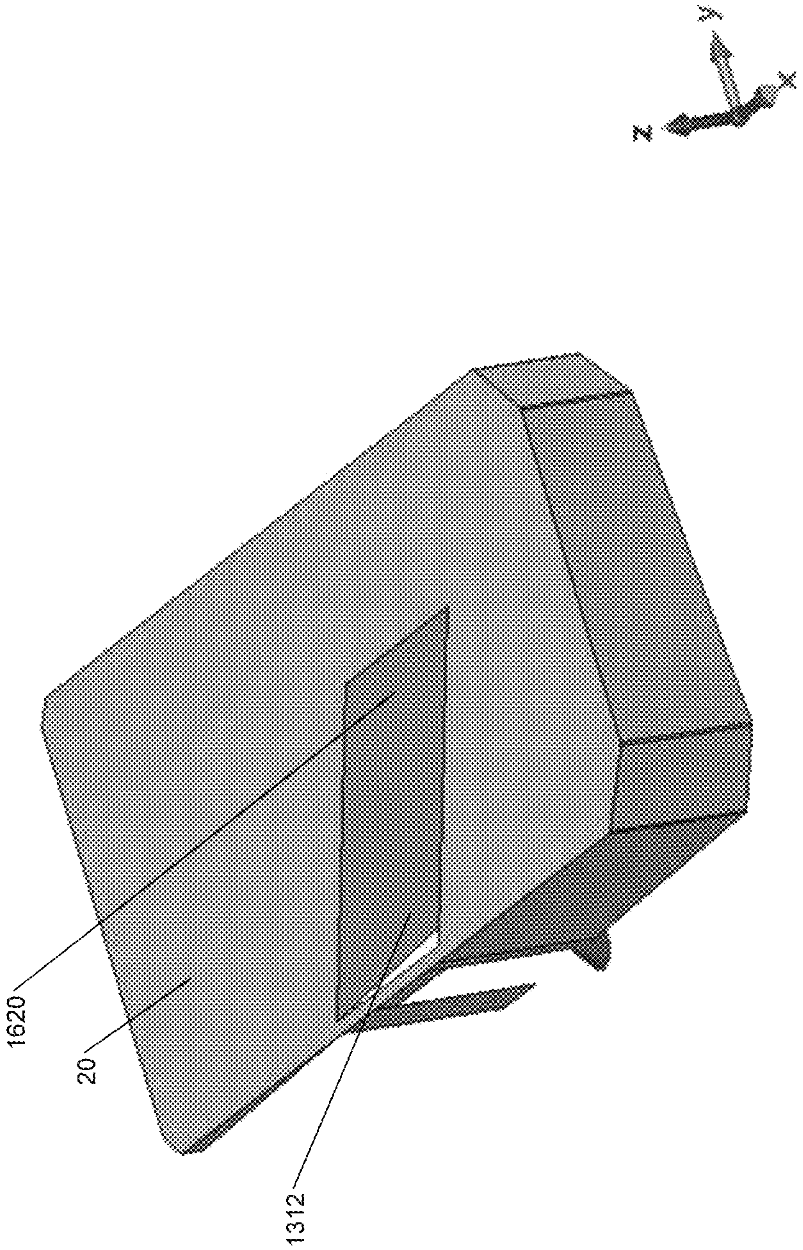

FIG. 12 is a side perspective view of the UWB antenna showing the planar cap portion 20. FIG. 13 is a side perspective view of the UWB antenna. FIG. 14 is another side perspective view of the UWB antenna. FIG. 15 is a side perspective view of the UWB antenna of FIG. 6 showing the planar cap portion 20. FIG. 16 is a top side perspective view of the UWB antenna. FIG. 17 is a top side perspective view of the UWB antenna. FIG. 18 is a top side perspective view of the UWB antenna with the planar cap portion 20 removed (not shown). FIG. 19 is a top side perspective view of the UWB antenna with the planar cap portion 20 removed. FIG. 20 is a top side perspective view of the UWB antenna with the planar cap portion 20.

The tapered side portion 24 decreases in height 1304 continuously (e.g., monotonically) around the outer edges of the UWB antenna from (a) where feed 1308 connects to (b) ground connecting portion 1312. The ground connecting portion 1312 electrically connects the UWB antenna to the ground plane. Because the tapered side portion 24 decreases in height, the gap 1316 continuously (e.g., monotonically) increases around the outer edges of the UWB antenna from (a) where feed 412 connects to (b) the ground connecting portion 416. The gap herein may refer to a distance between a lower edge of the tapered side portion 24 and the ground plane. The gap may also be referred to as a slot.

As illustrated for example in FIG. 16, corners 1604 of the planar cap portion 20 may be non-rounded. For example, the corners 1604 may be at approximately a 45 degree angle relative to adjacent sides, such as 1608 and 1612.

The planar cap portion 20 may include an aperture 1620. In various implementations, aperture 1620 may be approximately the same shape as the ground connecting portion 1312 and an edge of the ground connecting portion 1312 may be joined with an edge of the aperture 1620, such as illustrated in FIG. 17. The ground connecting portion 1312 may be, for example, cut from the planar cap portion 20 on three edges and bent/folded downward as to be perpendicular to the planes of the ground plane and the planar cap portion 20. The ground connecting portion being cut from the planar cap portion may decrease manufacturing complexity of the UWB antenna.

Figure 21:
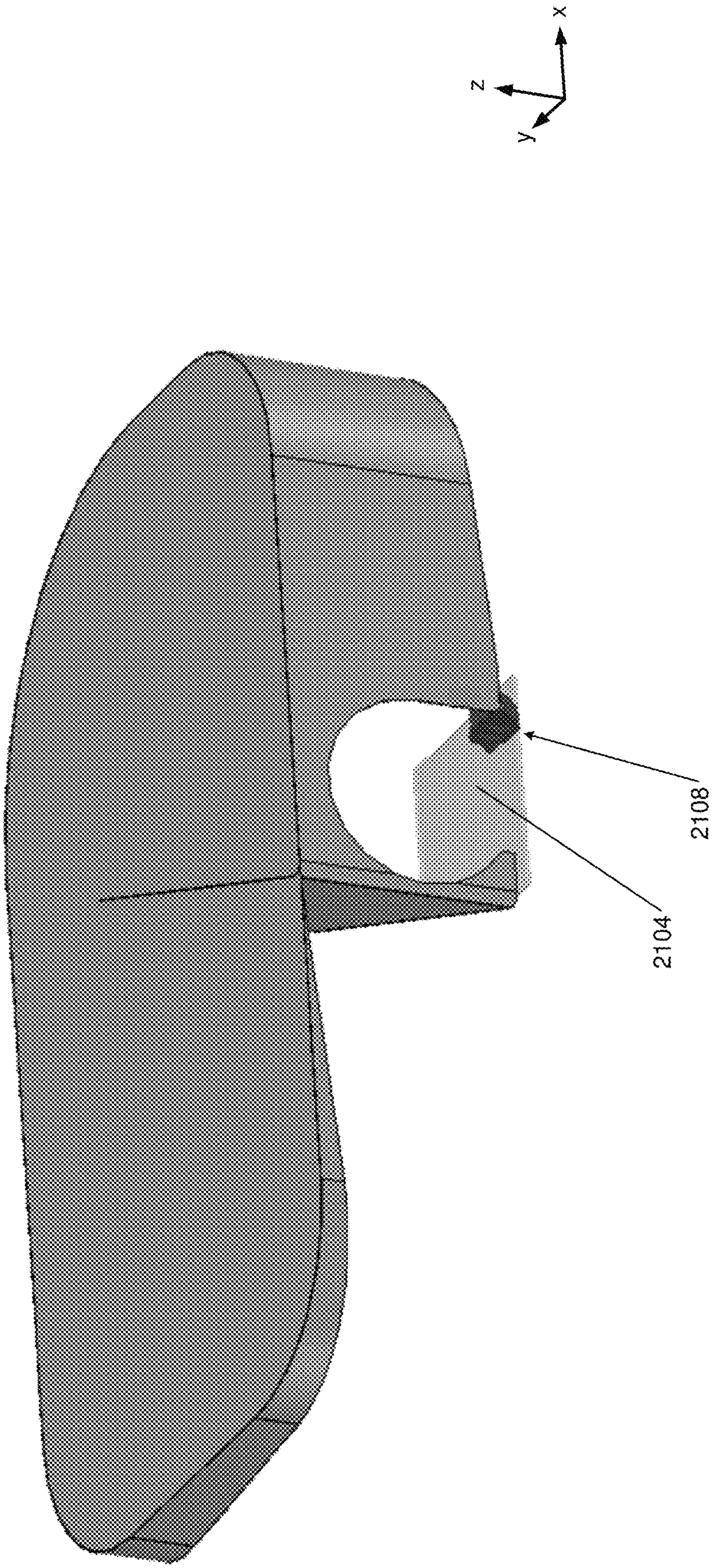
FIGS. 21-24 include perspective views of example matching networks disposed on a circuit board.
Figure 22:
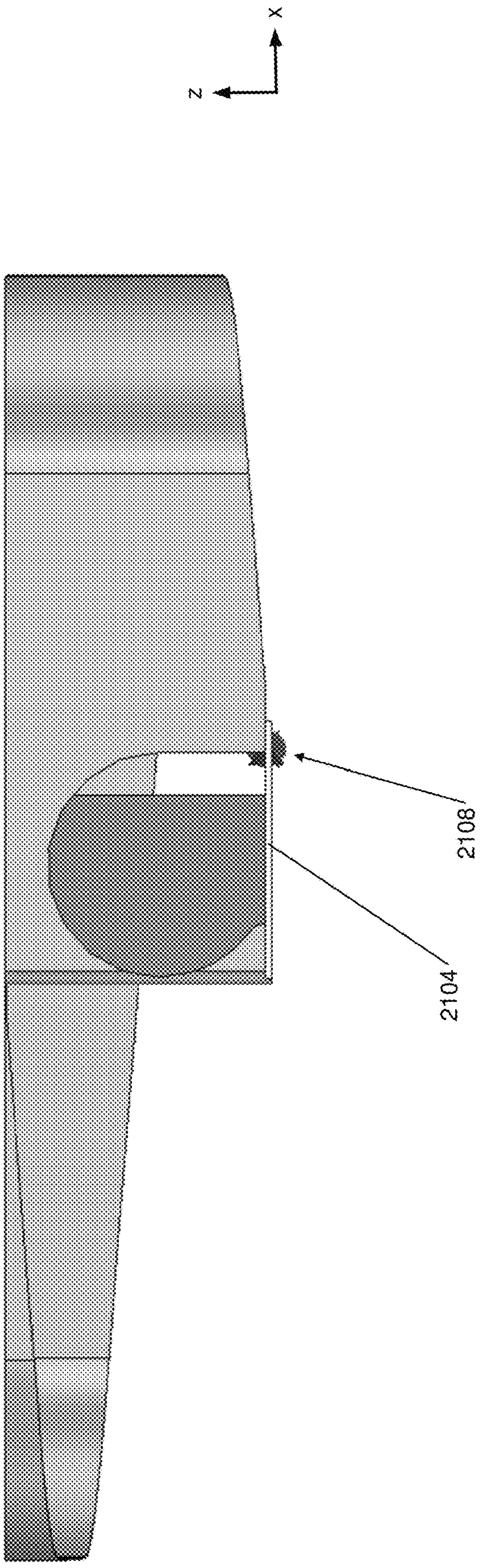
Figure 23:
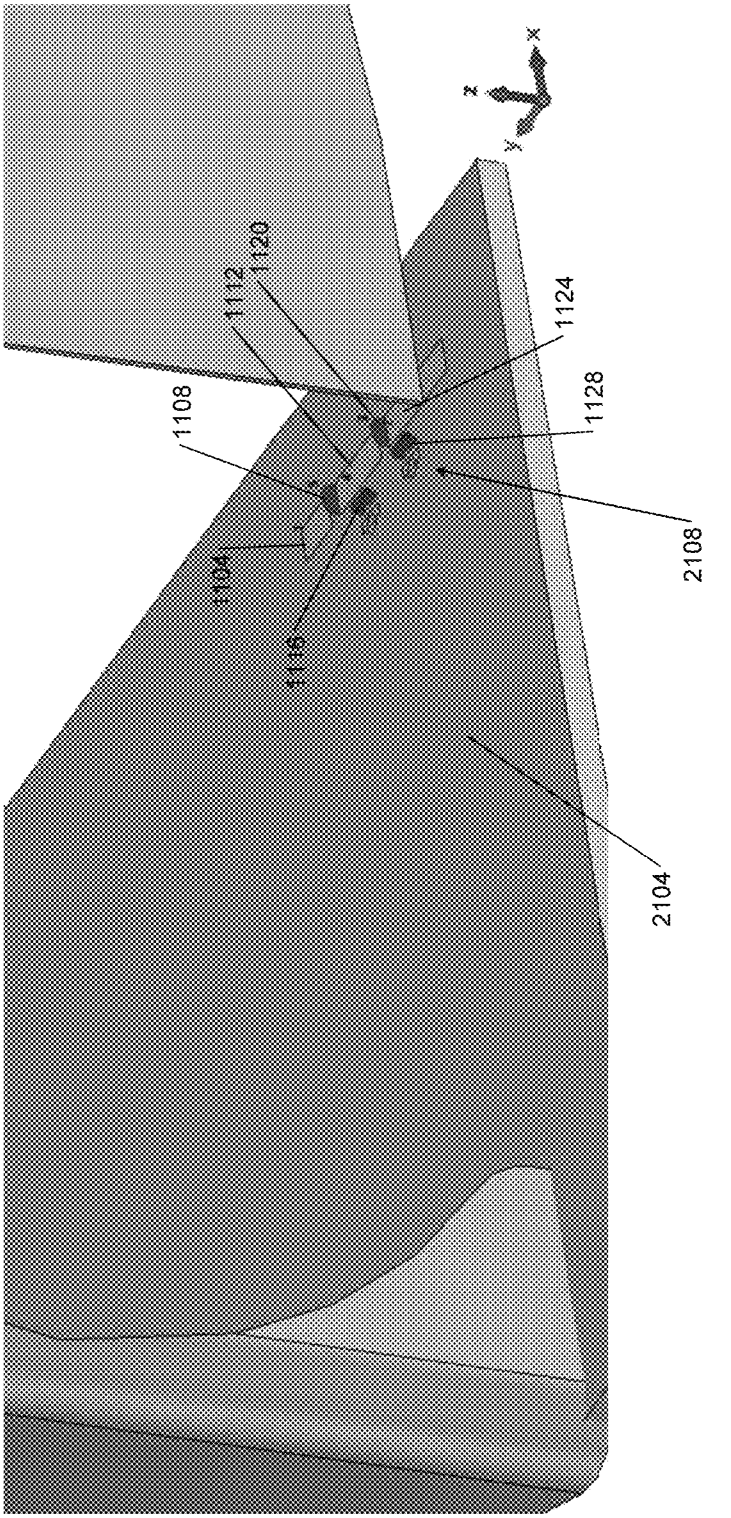
Figure 24:
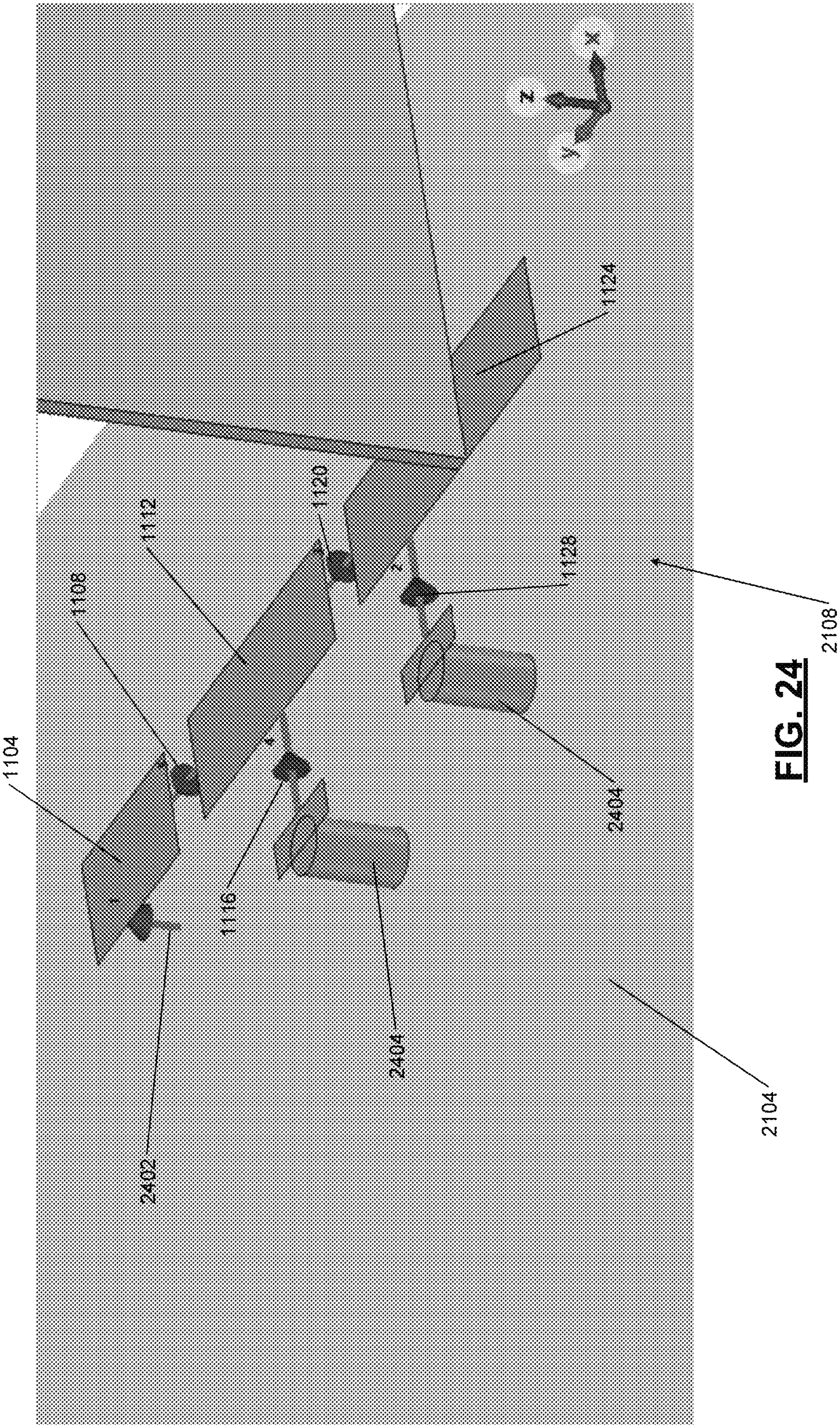
Figure 25:
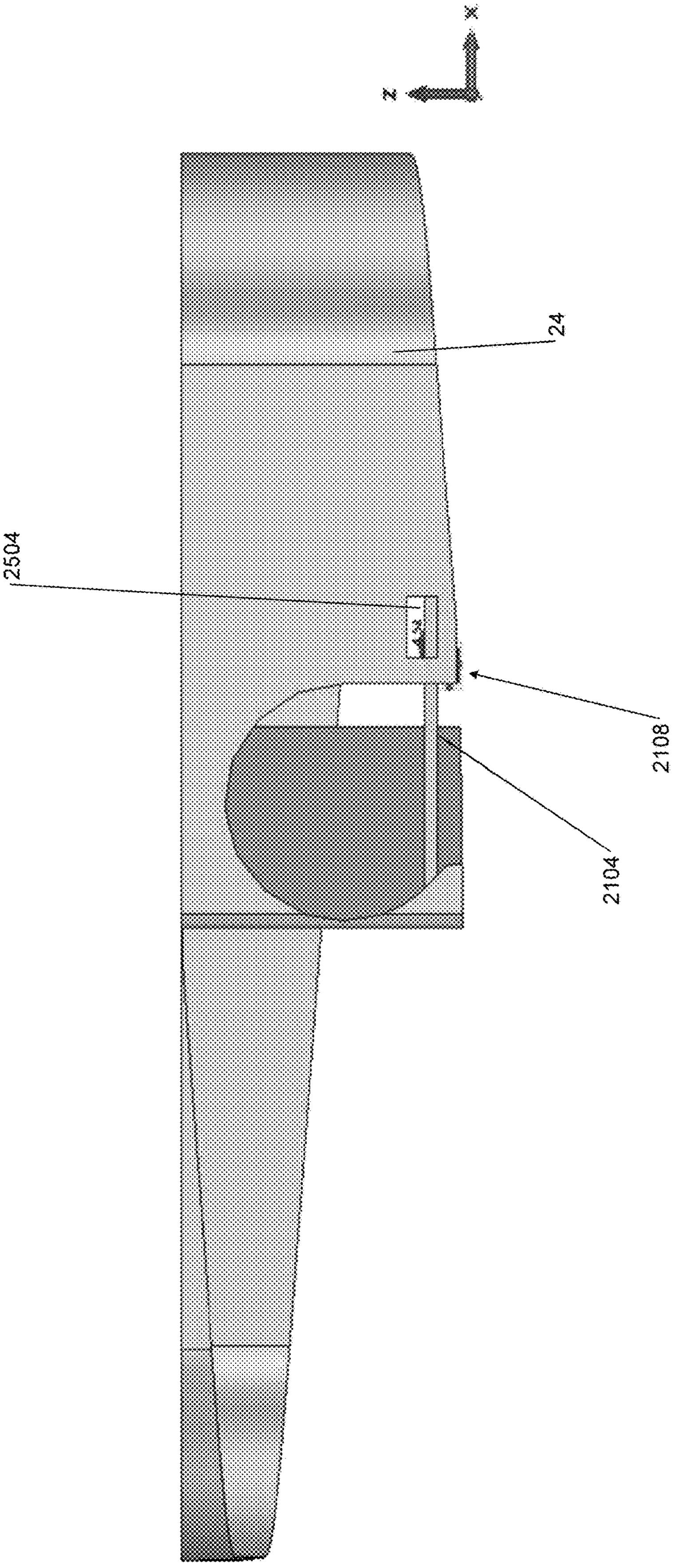
FIGS. 25-29 include an example UWB antenna with the circuit board extending through an aperture in the tapered side portion of the UWB antenna.

In various implementations, a matching network, if included, may be disposed on a circuit board. FIGS. 21-29 include perspective views of example matching networks 2108 disposed on a circuit board 2104. As illustrated in FIGS. 21-21-24, the circuit board 2104 may be disposed between lower edges of the UWB antenna and the ground plane and at least partially under the RF balun. In the example of FIGS. 21-24, the RF balun is circular as in the example of FIG. 10.

FIG. 21 is a top side perspective view of the UWB antenna and the circuit board 2104. FIG. 22 is a side perspective view of the UWB antenna and the circuit board 2104. FIGS. 23 and 24 are zoomed in perspective views of the circuit board 2104 and matching network 2108. As shown in FIG. 24, vias 2404 may be formed through the circuit board 2304 to electrically connect the matching network 2108 to the ground plane.

The circuit board 2104, however, may be disposed differently with the UWB antenna. For example, FIGS. 25-29 include an example UWB antenna with the circuit board 2104 extending through an aperture 2504 in the tapered side portion 24. The example of FIGS. 25-29 may decrease the total height of the UWB and circuit board and decrease manufacturing complexity. As illustrated in FIG. 27, in this example the circuit board 2104 includes an extension portion 2704 that extends through the aperture 50. In various implementations, a non-electrically conductive material (e.g., a dielectric material, such as nylon or plastic) may be disposed within the remainder of the aperture 2504 not occupied by the circuit board 2104.

In various implementations, such as in the example of FIG. 21, the circuit board 2104 may lie on the ground plane. The feed 2402 extends through the circuit board 2104 as illustrated in FIG. 24 and connects to 1104.

Figure 26:
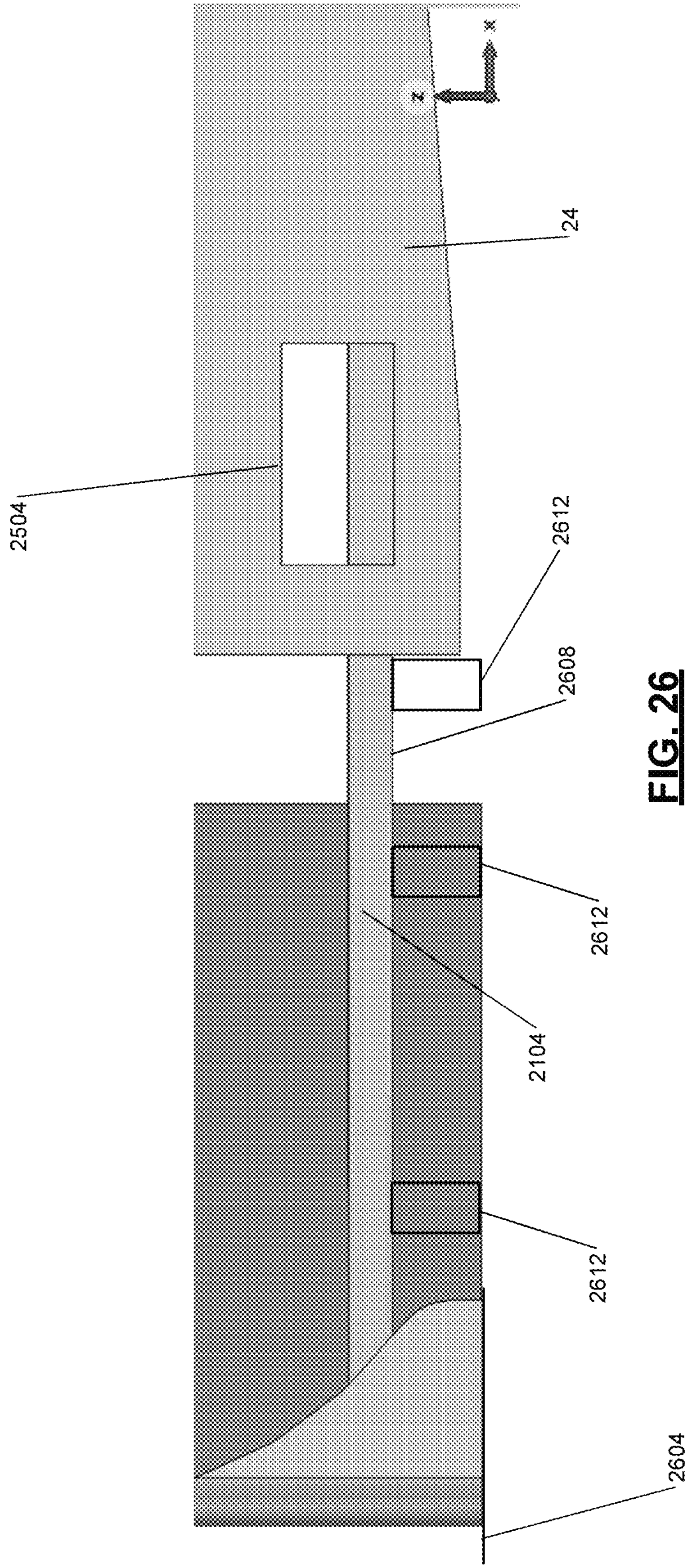
Figure 27:
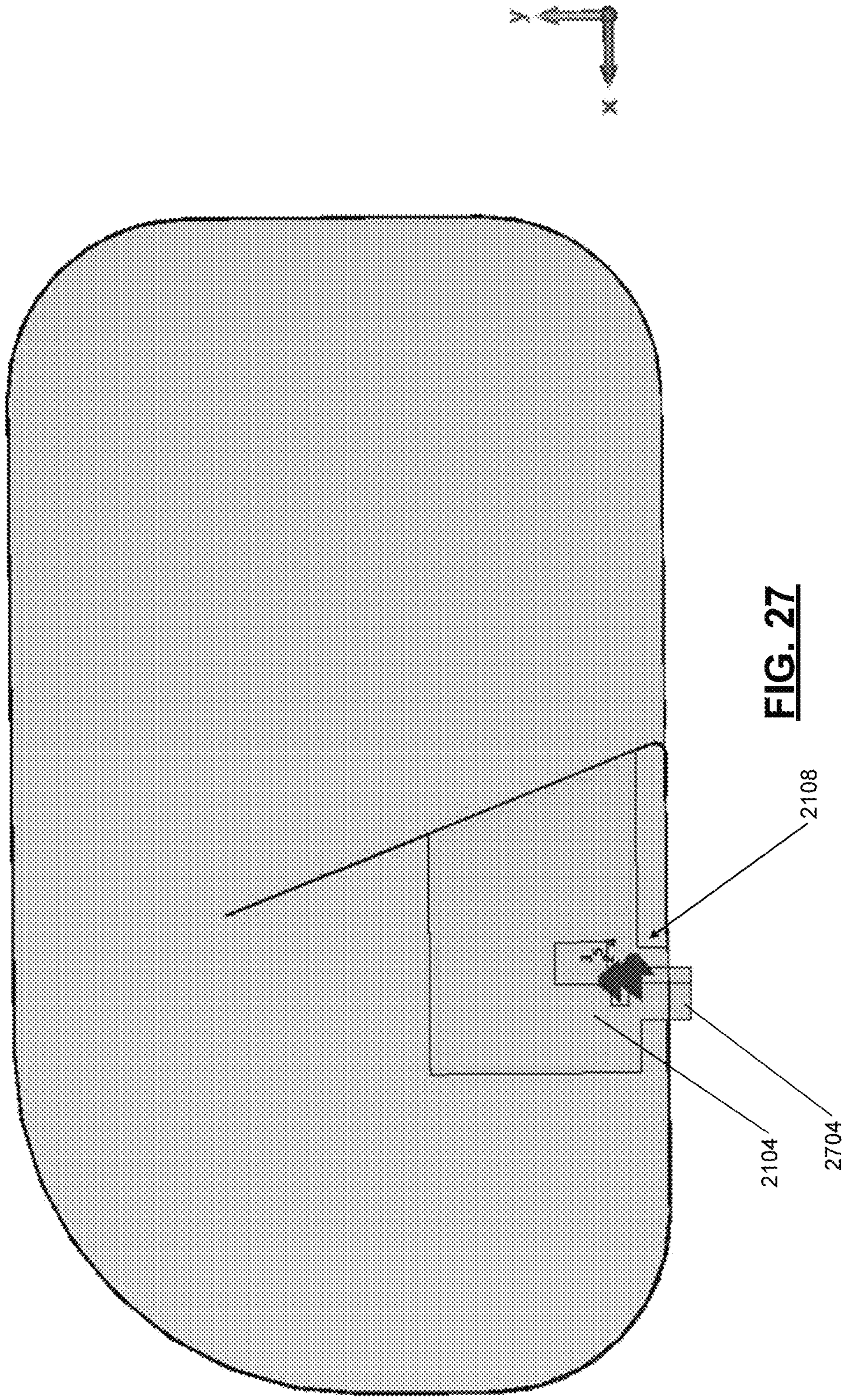

In various implementations, such as shown in the example of FIG. 26, air may be present between ground plane 2604 and the circuit board 2104. In such an implementation, circuit components and electrical conductors may be disposed on the bottom surface 2608 of the circuit board 2104 between the circuit board 2104 and the ground plane 2604. This may allow for easier electrical connectivity to electrical components on the circuit board 2104.

Figure 38:
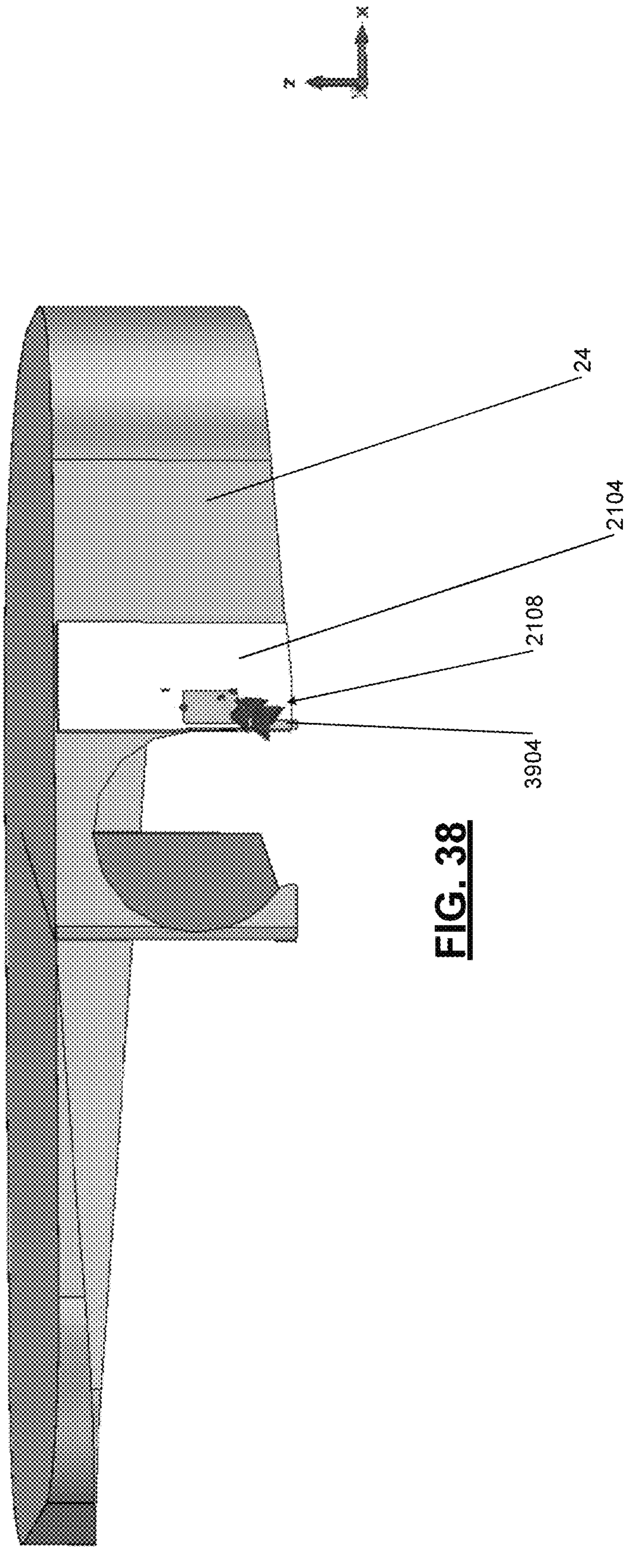
FIGS. 38-40 illustrate another example orientation of the circuit board and matching network including an RF balun.

As illustrated in the example of FIG. 26, one or more electrically non-conductive (e.g., nylon, plastic, etc.) spacers 2612 may be implemented to maintain separation between the circuit board 2104 and the ground plane 2604. In various implementations, the circuit board 2104 may include a conductor on the circuit board 2104 that electrically connects to the ground plane, and the circuit components on the circuit board 2014 may connect to the conductor. FIG. 38 includes such an example and is discussed further below.

Figure 28:
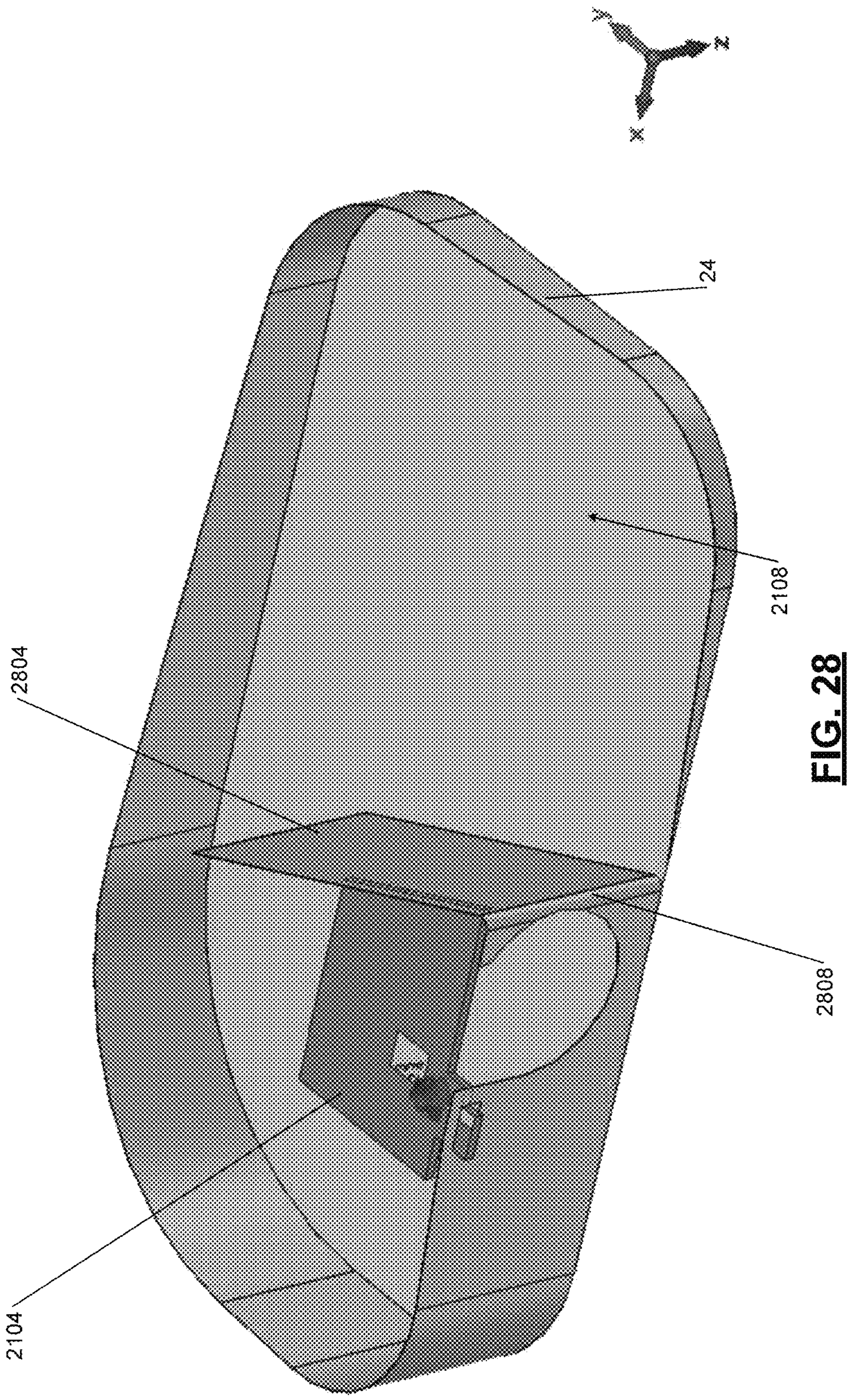
Figure 29:
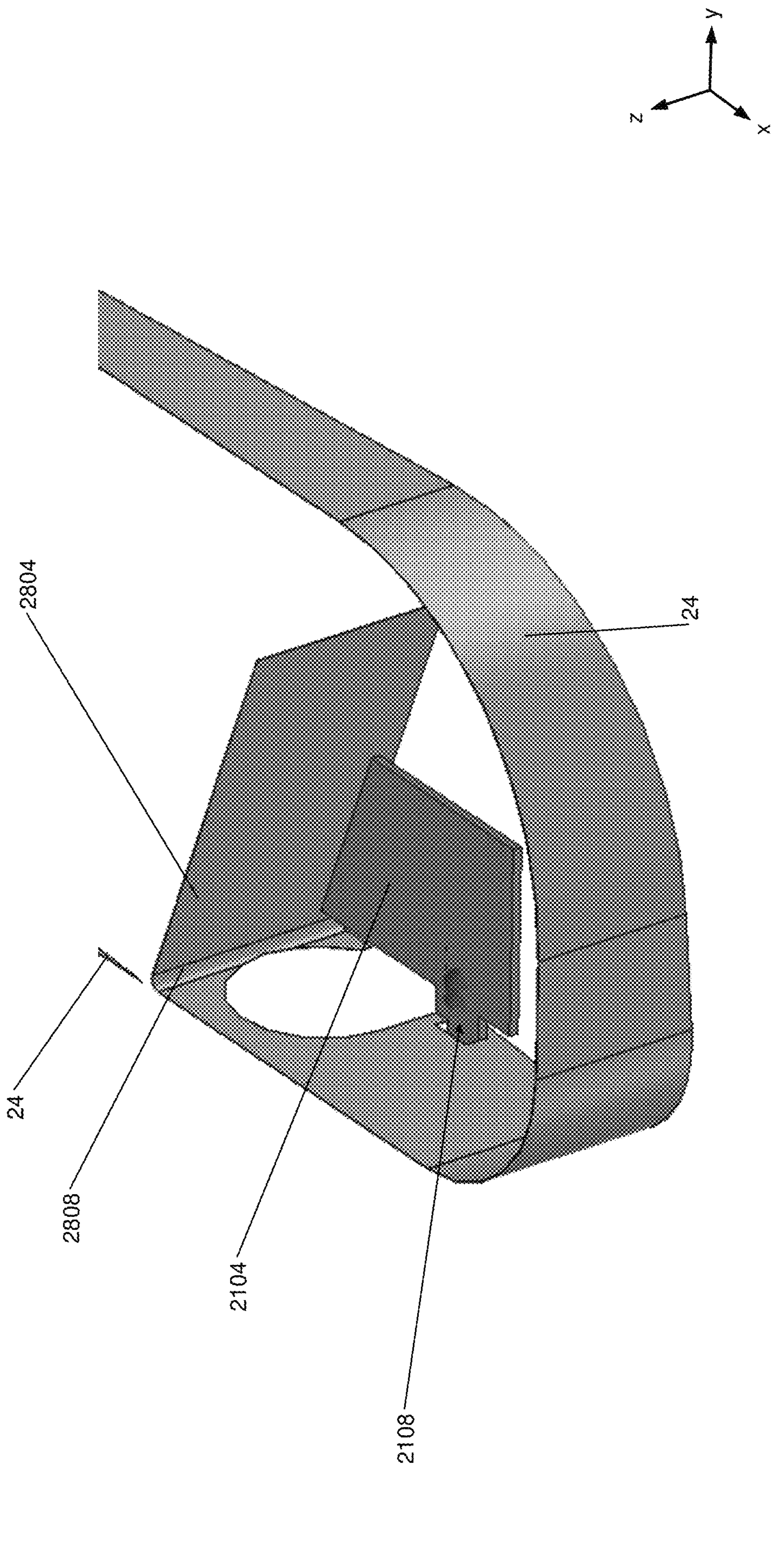

As illustrated in FIGS. 27-29, the ground connecting portion 2804 may be cut from the side under the tapered side portion 24 having the shortest height. The ground connecting portion 2804 in this example may share an edge 2808 with the portion of the tapered side portion 24 including the RF balun and be bent/folded inward. This may enable the UWB to be made of a single piece of material (e.g., metal) and decrease manufacturing complexity.

Figure 30:
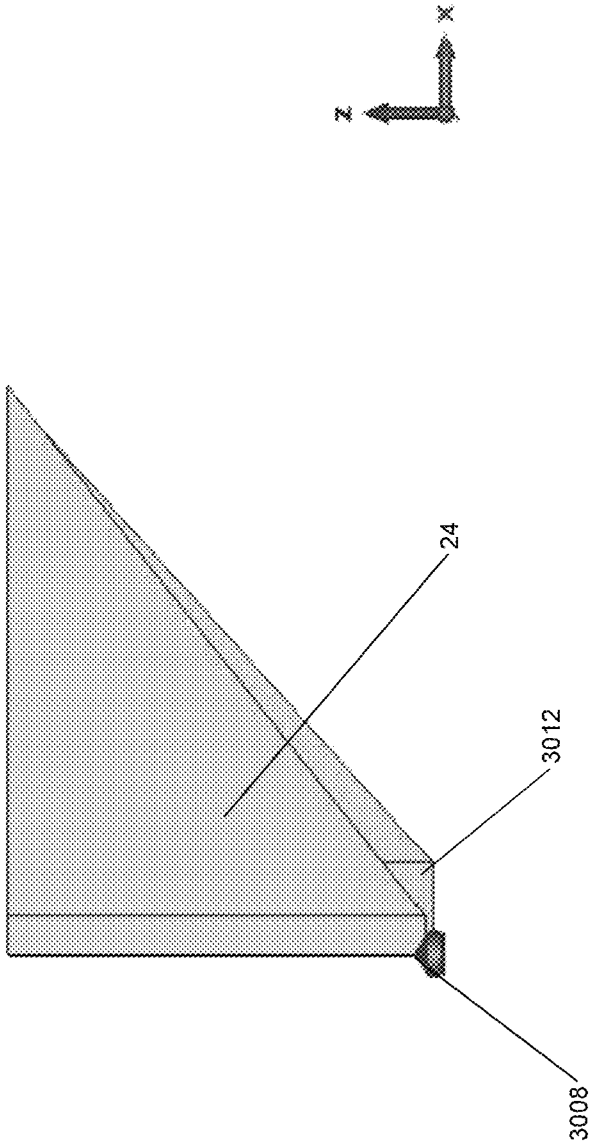
FIGS. 30-34 include perspective views of an example implementation of a UWB antenna including an RF balun.
Figure 31:
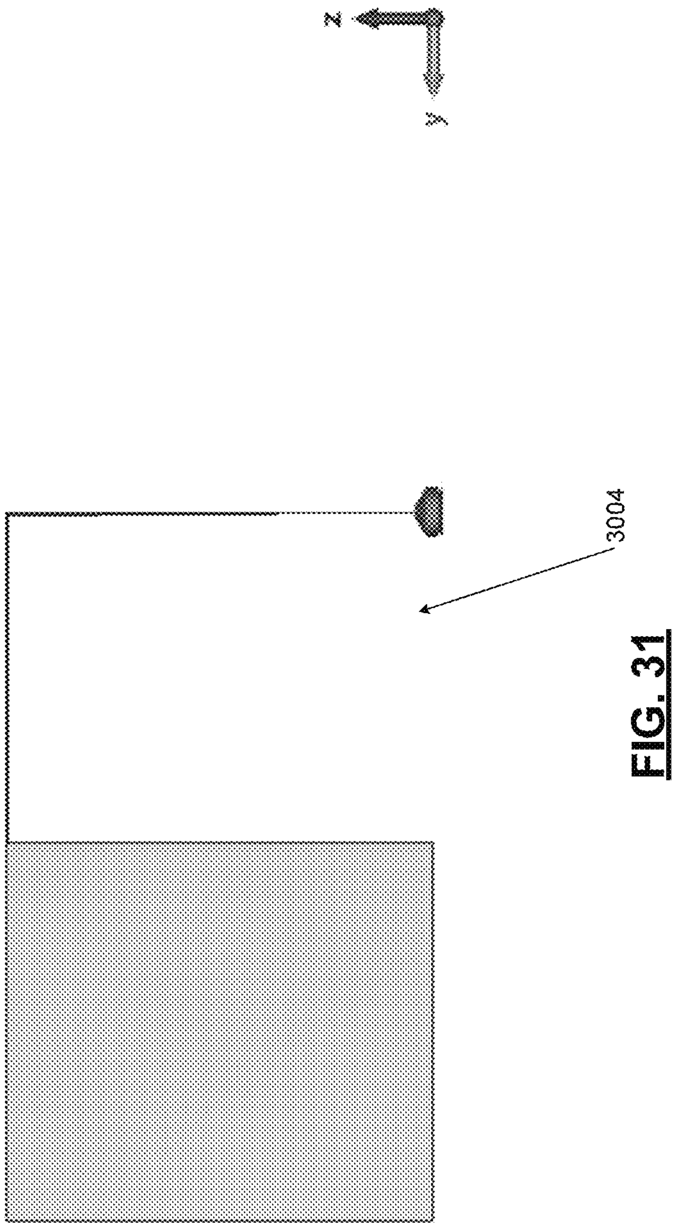
Figure 32:
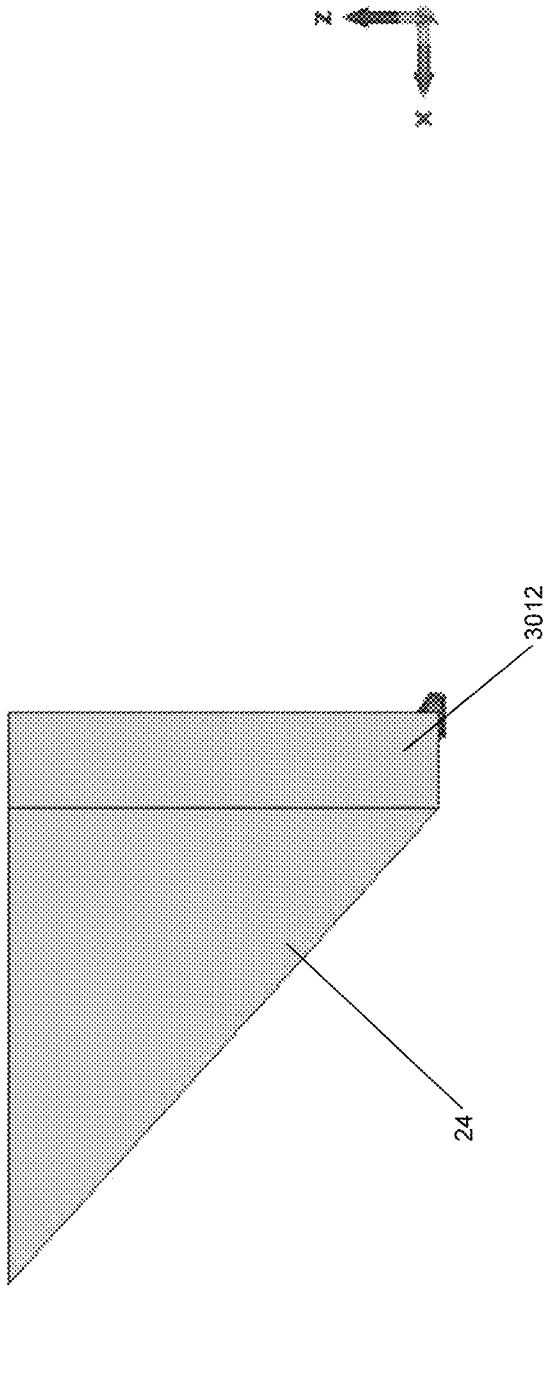
Figure 33:
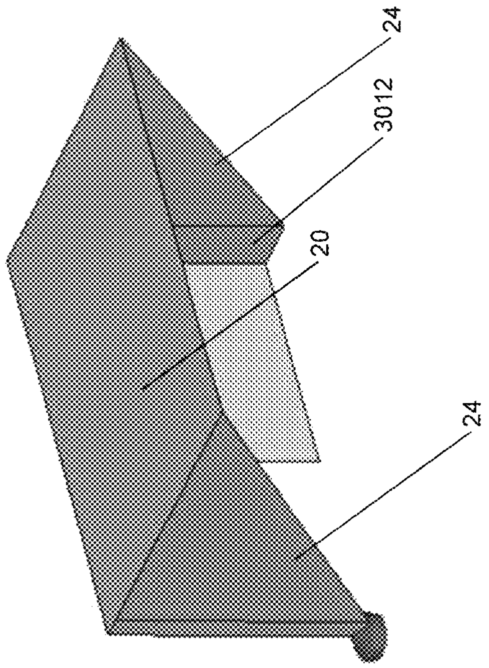
Figure 34:
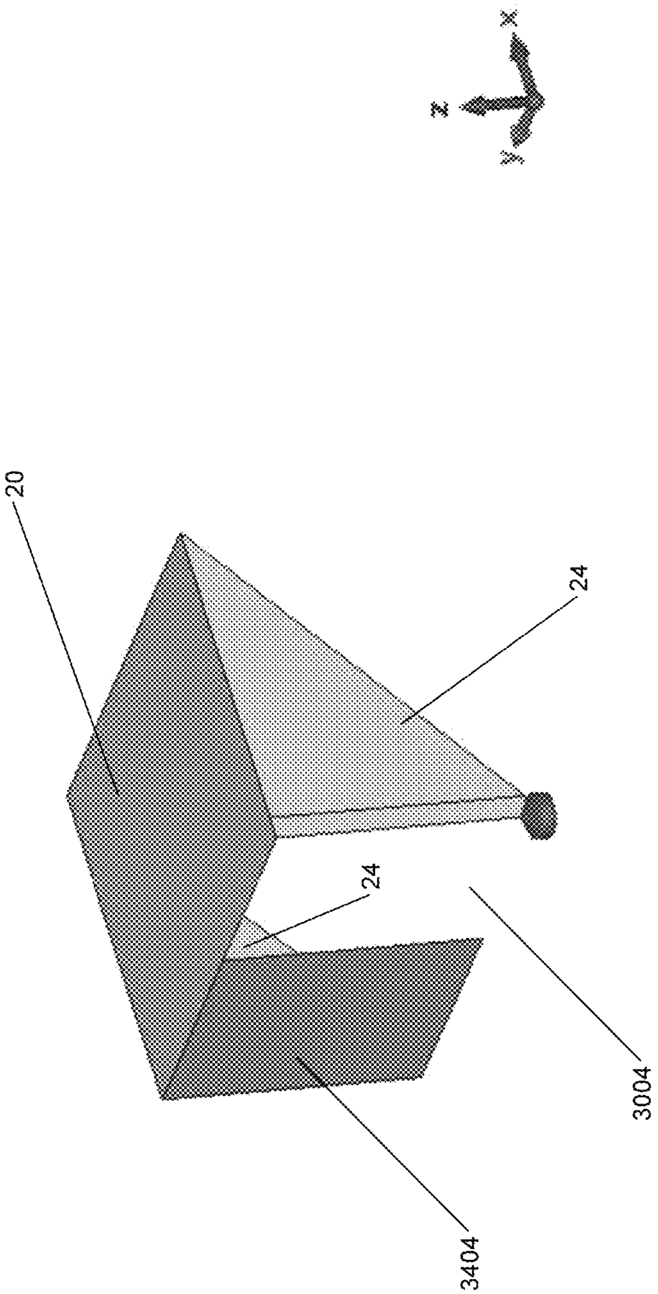

FIGS. 30-34 include perspective views of an example implementation of a UWB antenna including an RF balun 3004. FIG. 30 is a right side perspective view of the UWB antenna. FIG. 31 is a front side perspective view of the UWB antenna. FIG. 32 is a left side perspective view of the UWB antenna. FIG. 33 is a back side perspective view of the UWB antenna. FIG. 34 is a top front side perspective view of the UWB antenna.

3008 is where the feed electrically connects to the UWB antenna with or without a matching network. In the example of FIGS. 30-34, on the feed side of the UWB antenna, the tapered side portion 24 extends upwardly to the planar cap portion 20 such that a height of the tapered side portion 24 decreases (e.g., monotonically) on the feed side. On the ground connecting side the UWB antenna, opposite the feed side, the tapered side portion 24 extends downwardly to the ground connecting portion such that a height of the tapered side portion 24 increases (e.g., monotonically) on the ground connecting side. The UWB antenna may also include another ground connecting portion 3404 that electrically connects the UWB antenna (the ground side) to the ground plane and that adjusts the RF balun 3004.

Figure 35:
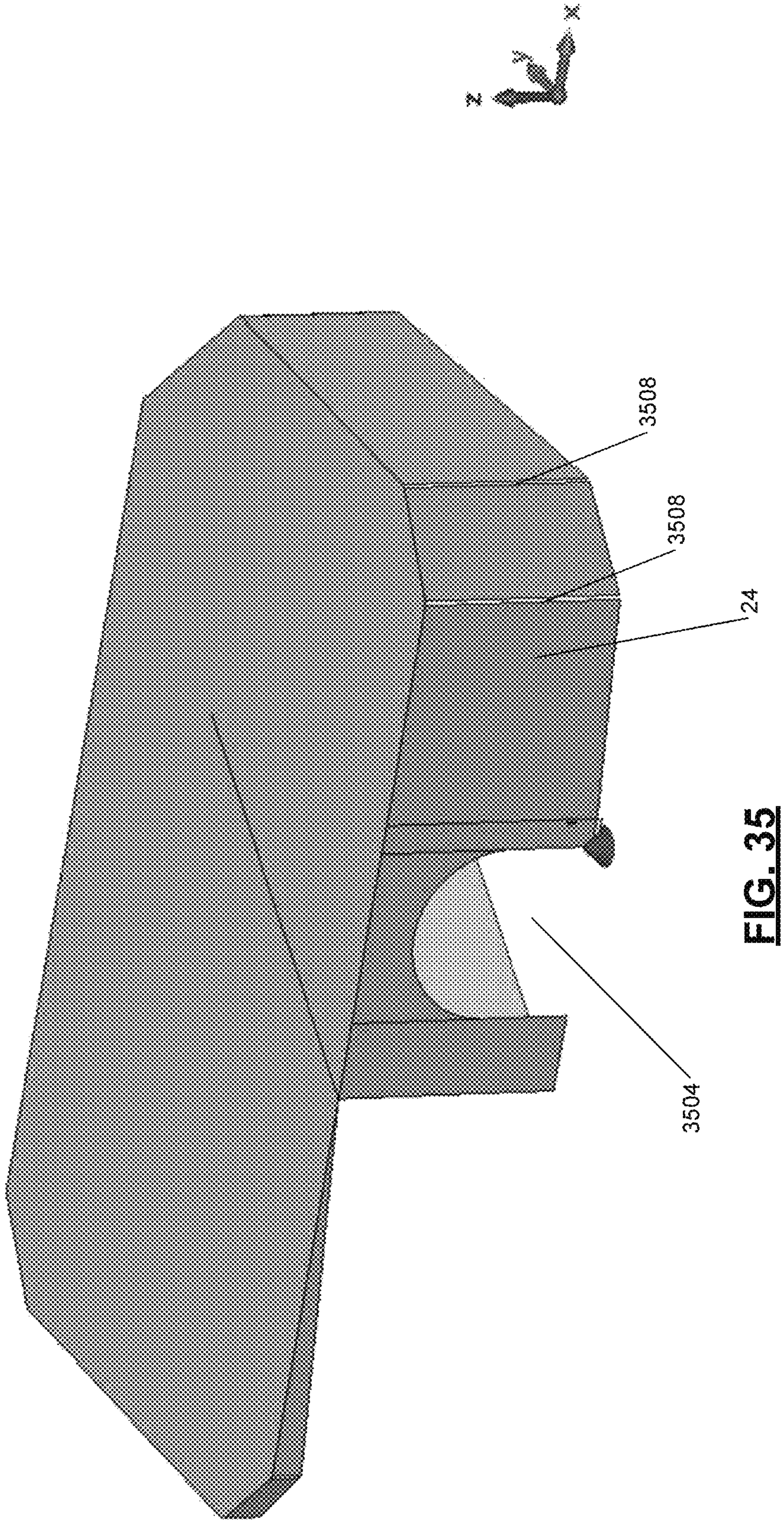
FIGS. 35-37 include perspective views of an example UWB antenna with an RF balun.
Figure 36:
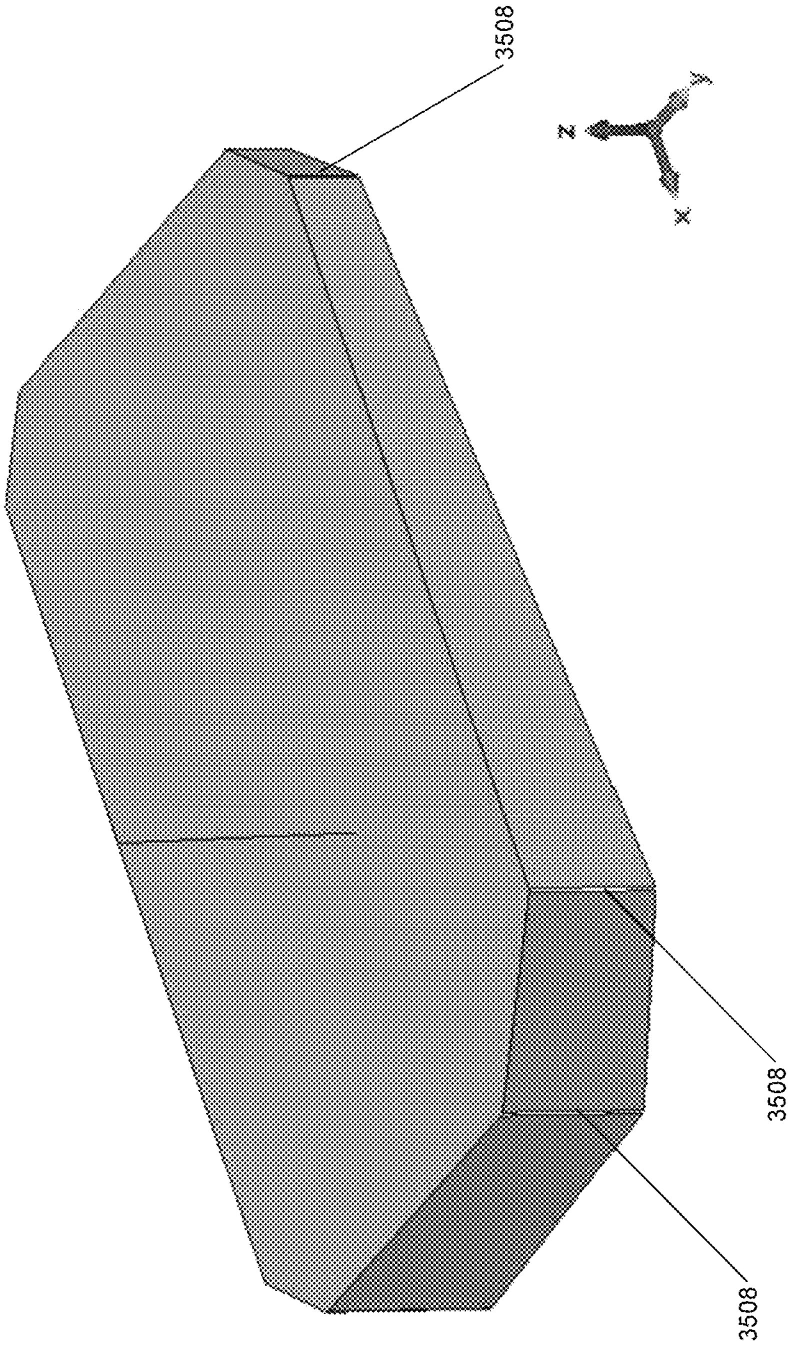
Figure 37:
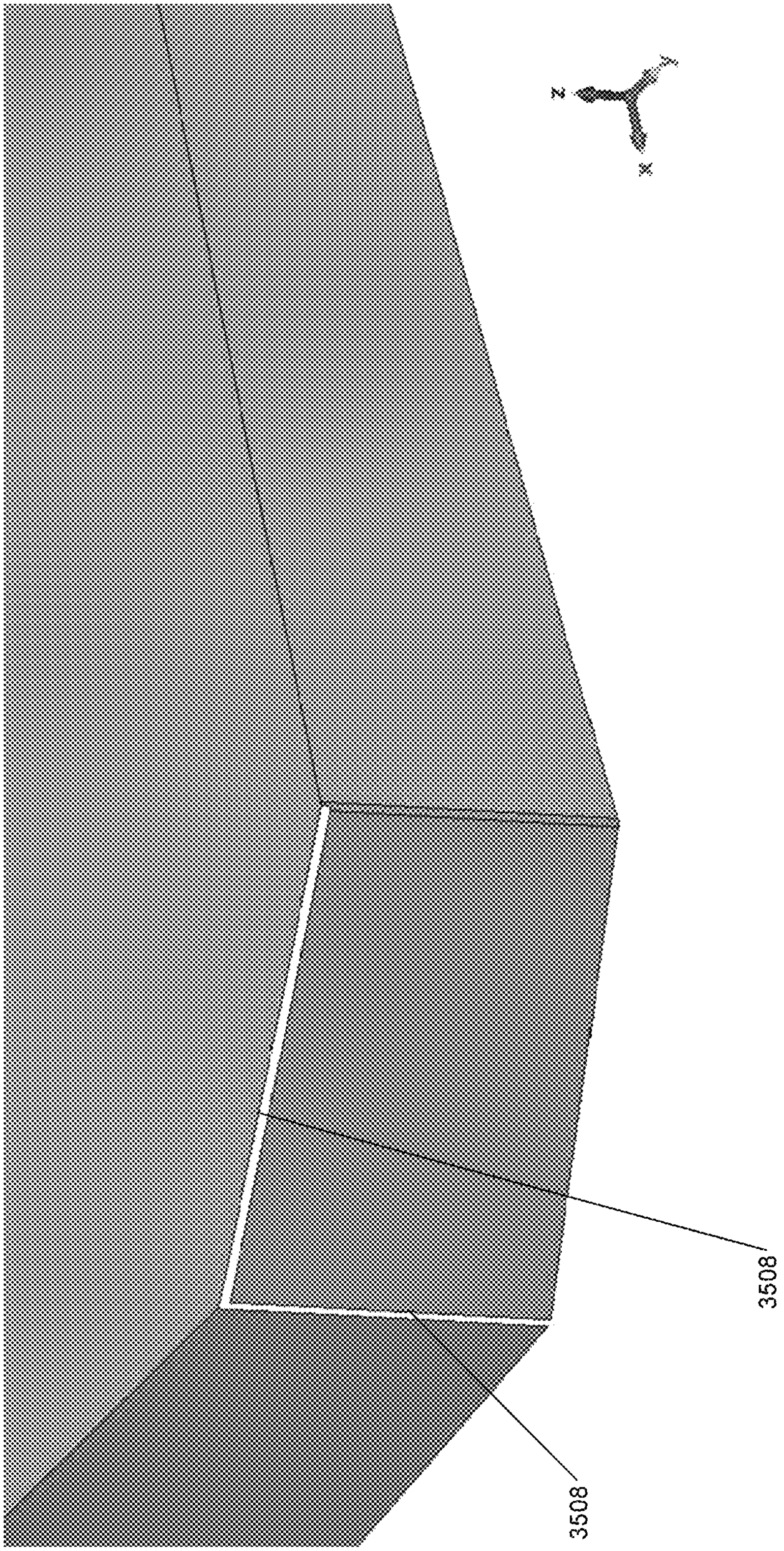

FIGS. 35-37 include perspective views of an example UWB antenna with a RF balun 3504. The RF balun 3504 may include a half-circular top above a rectangular bottom. In this example, slots 3508 are formed at the corners of the tapered side portion 24. In this manner, the slots 3508 may enable the tapered side portion 24 to be bent/folded into position and the UWB antenna to be formed from a single piece of material, decreasing manufacturing complexity.

Figure 39:
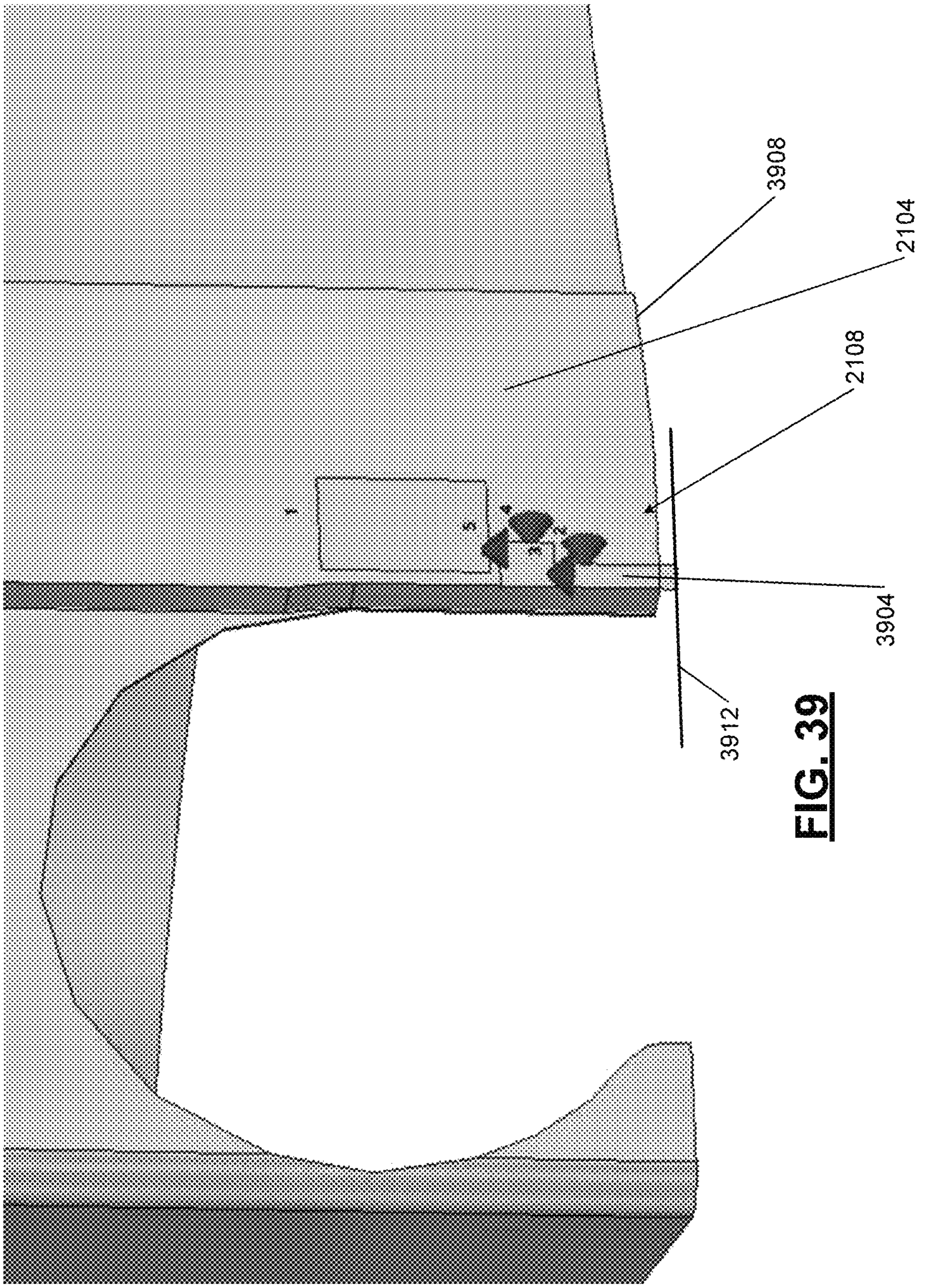
Figure 40:
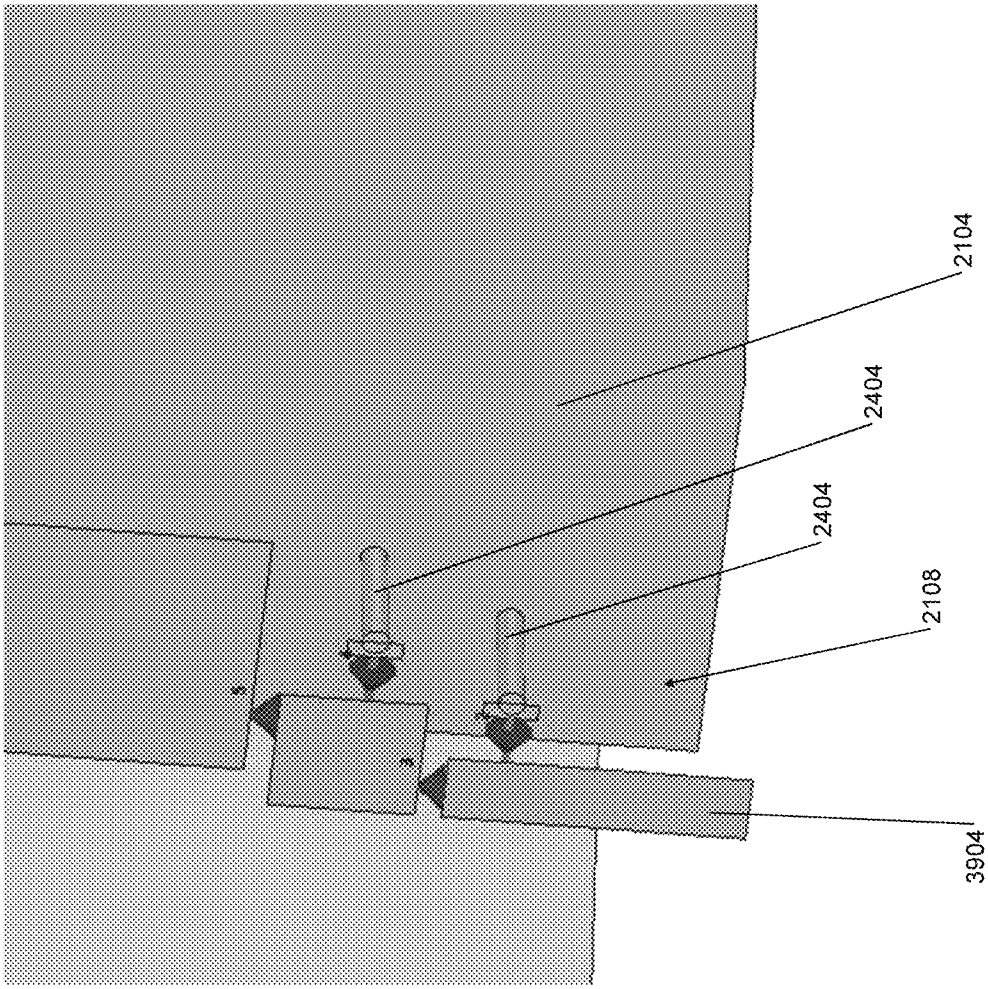
Figure 41:
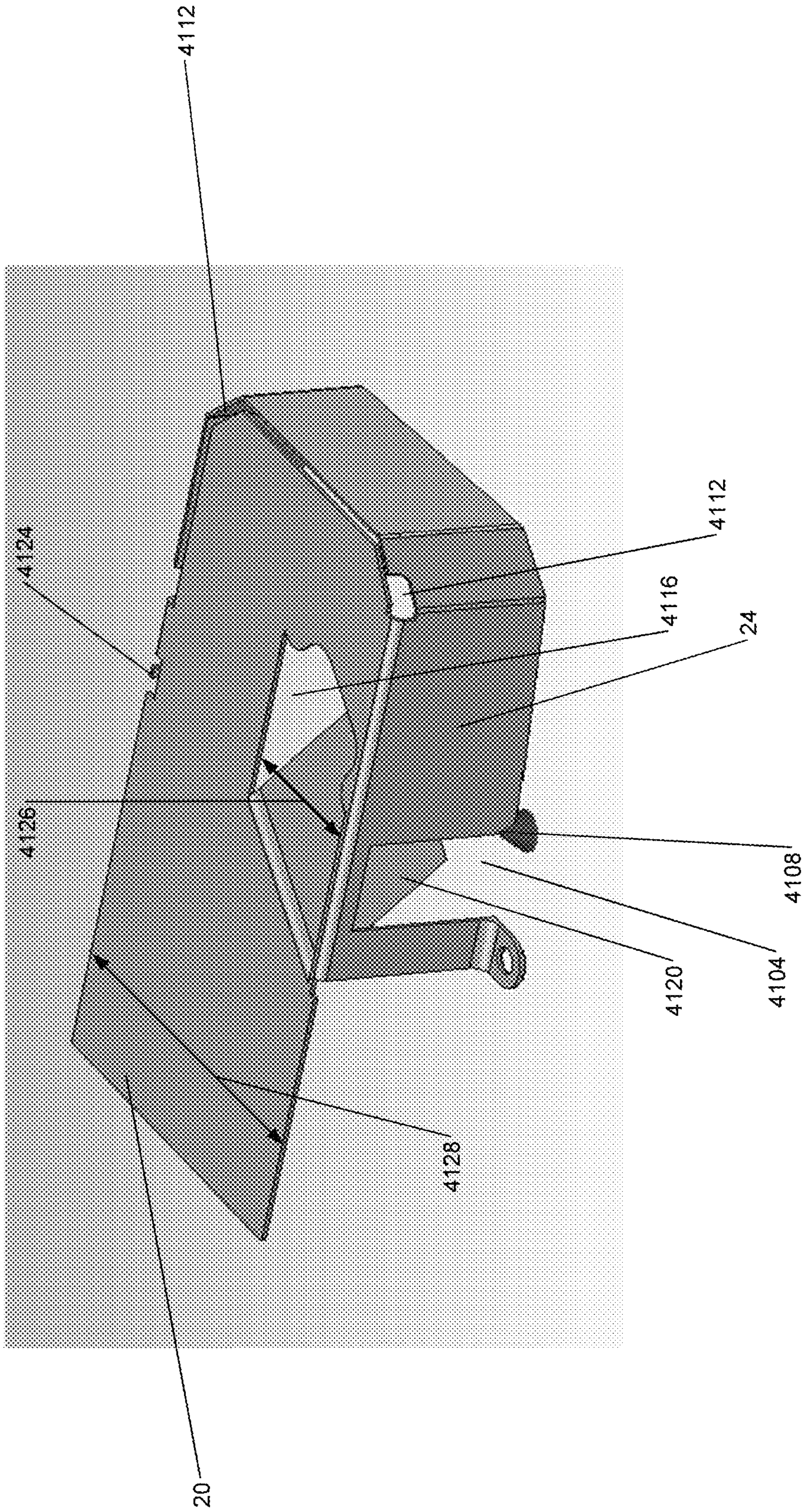
FIGS. 41-49 include perspective views of an example implementation of a UWB including a rectangular RF balun.
Figure 42:
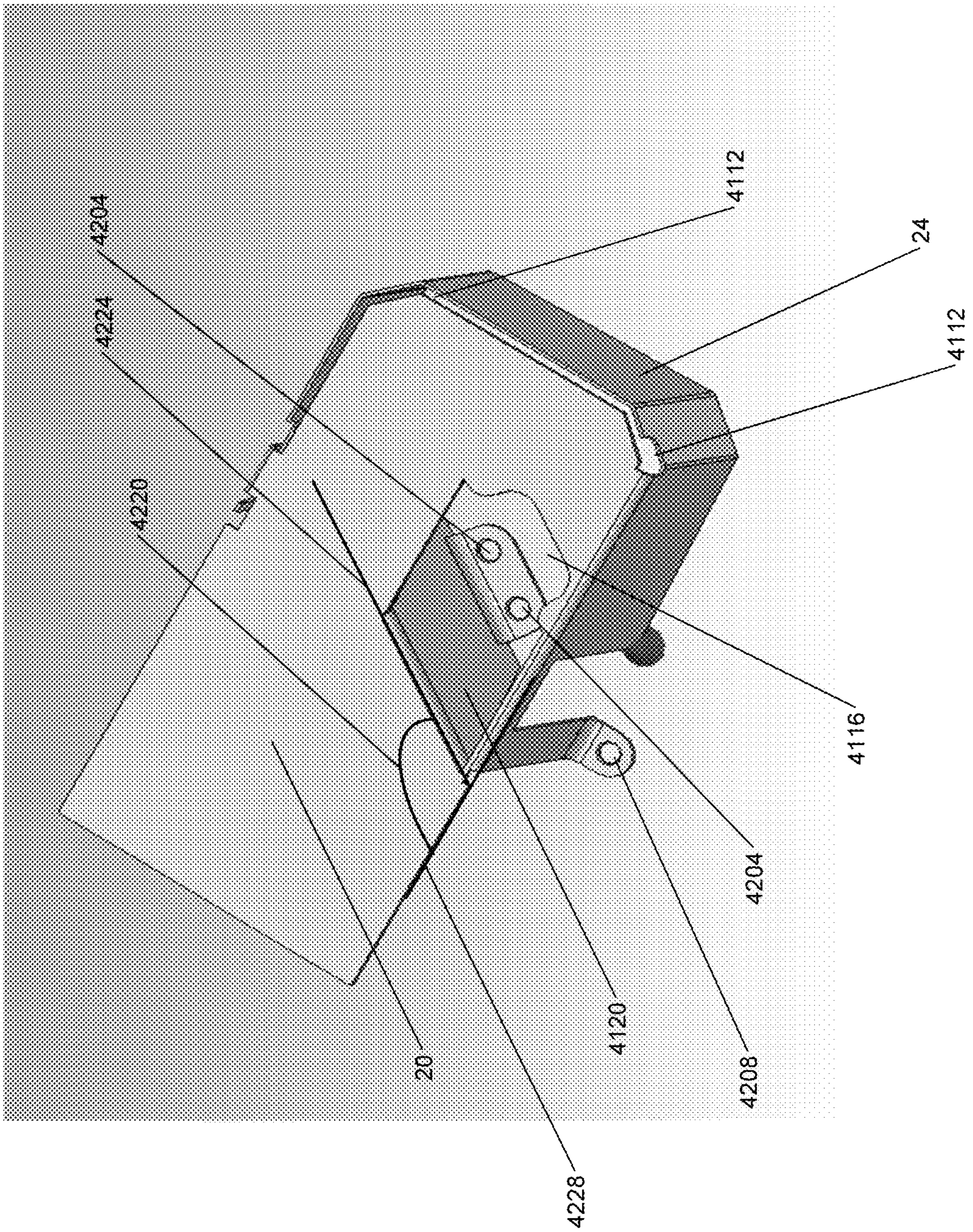
Figure 43:
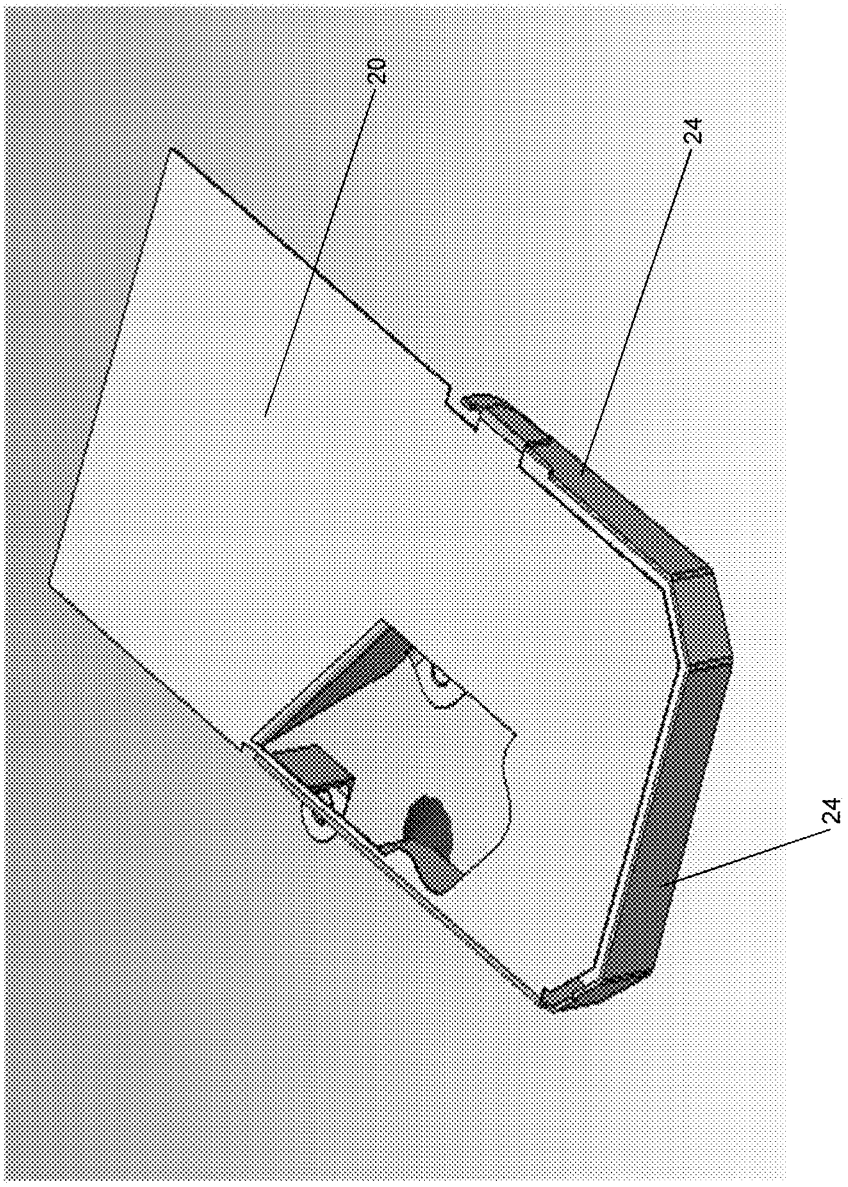
Figure 44:
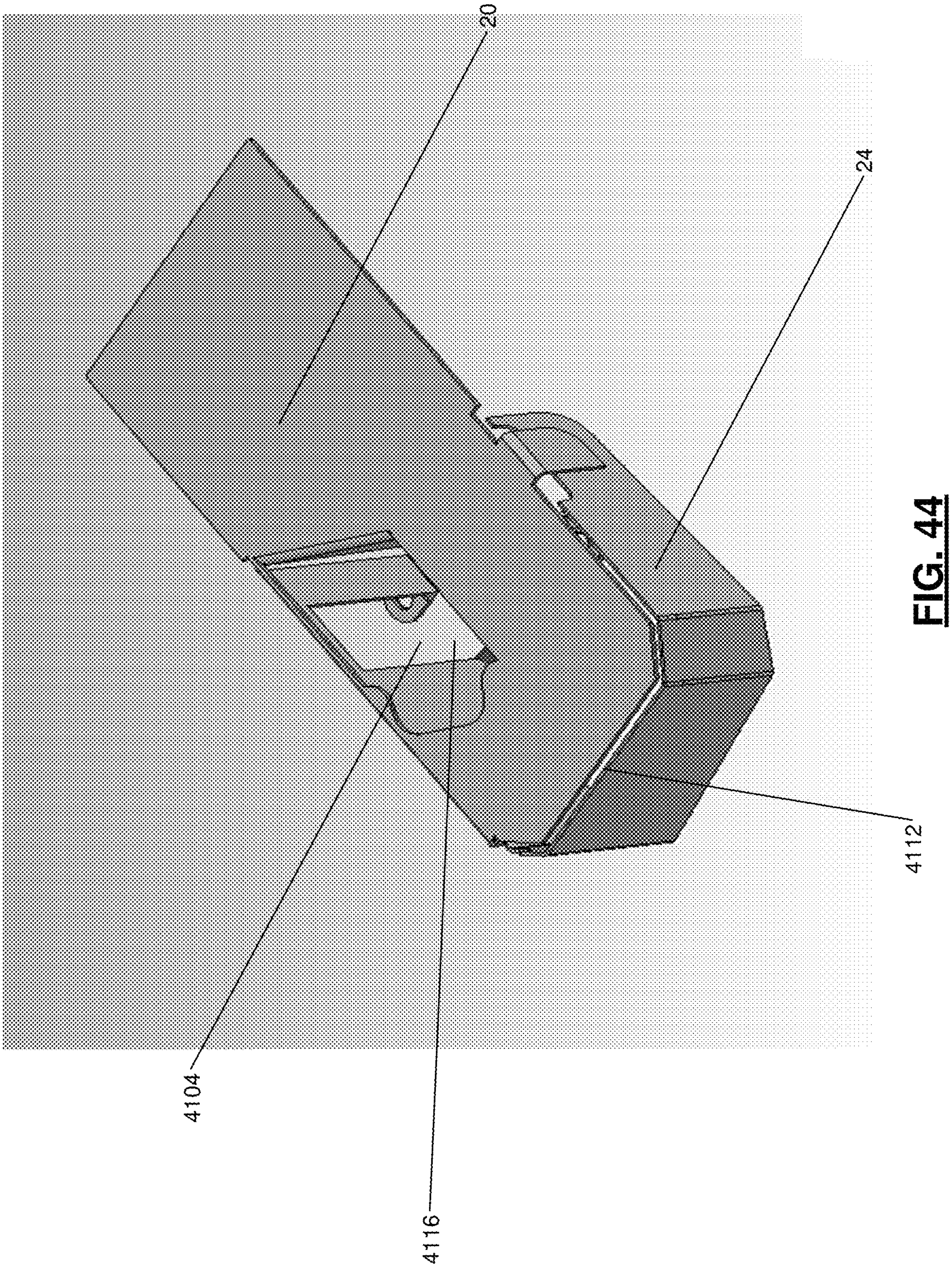
Figure 45:
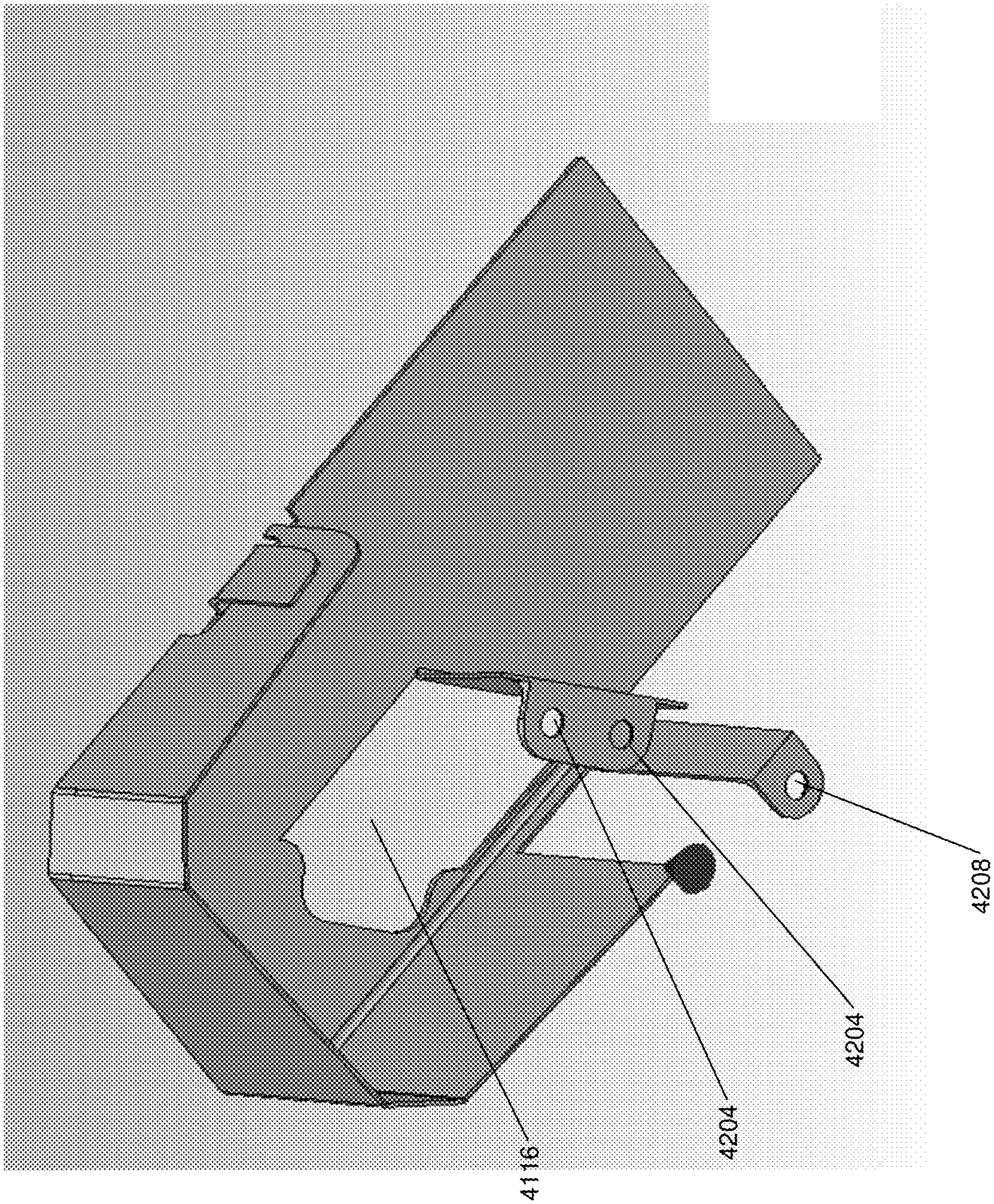
Figure 46:
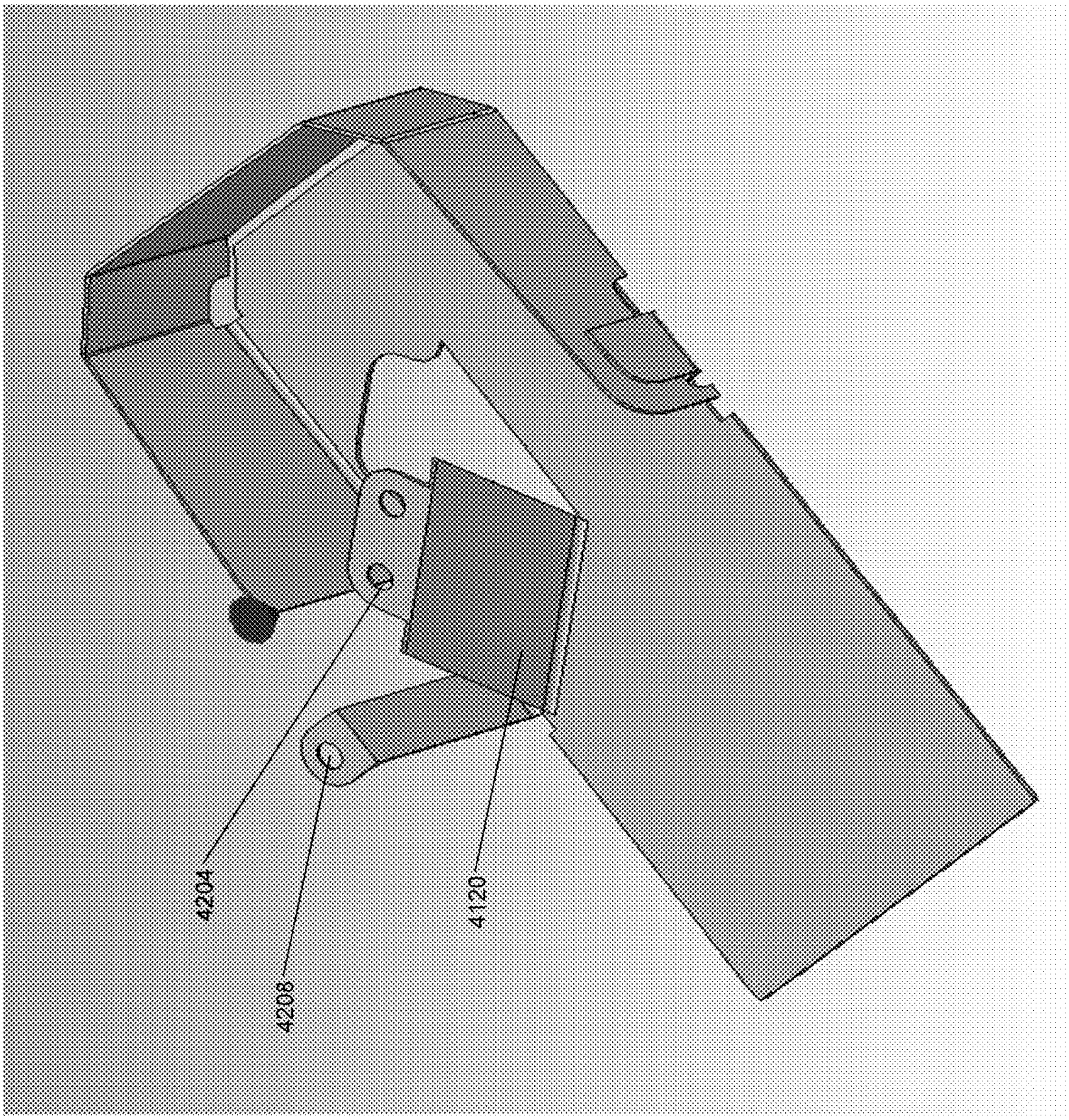
Figure 47:
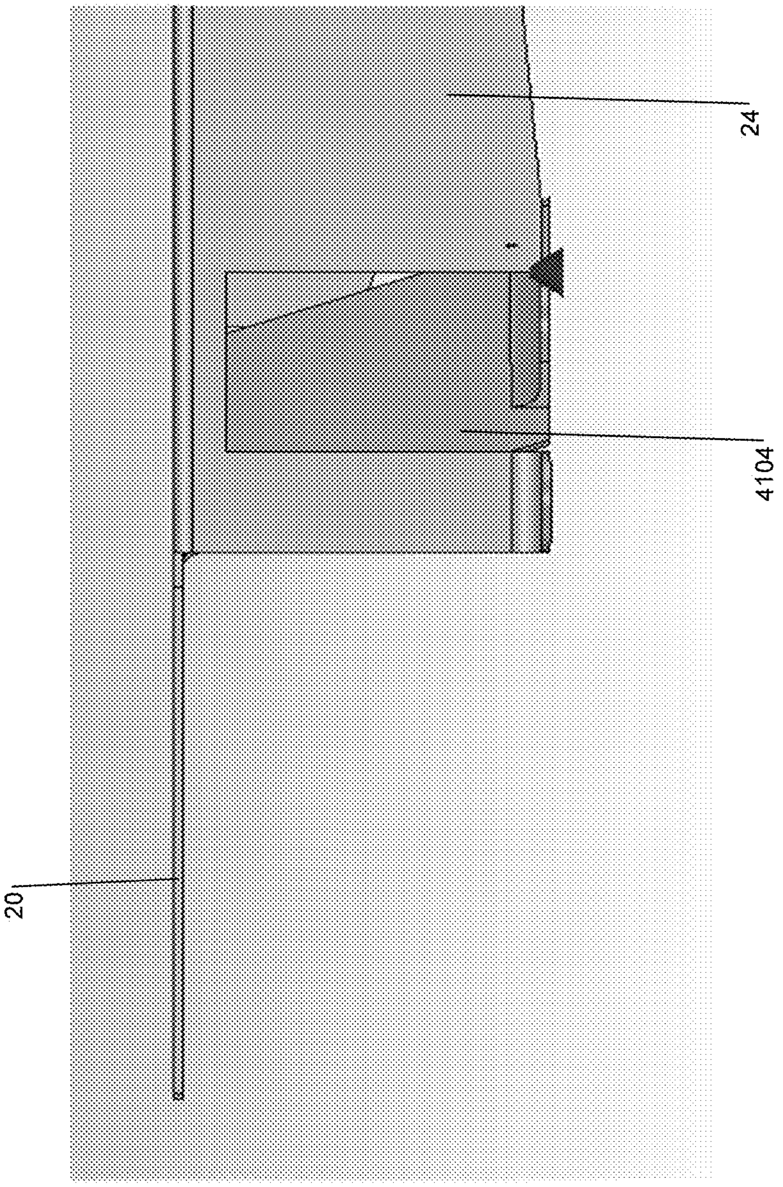
Figure 48:
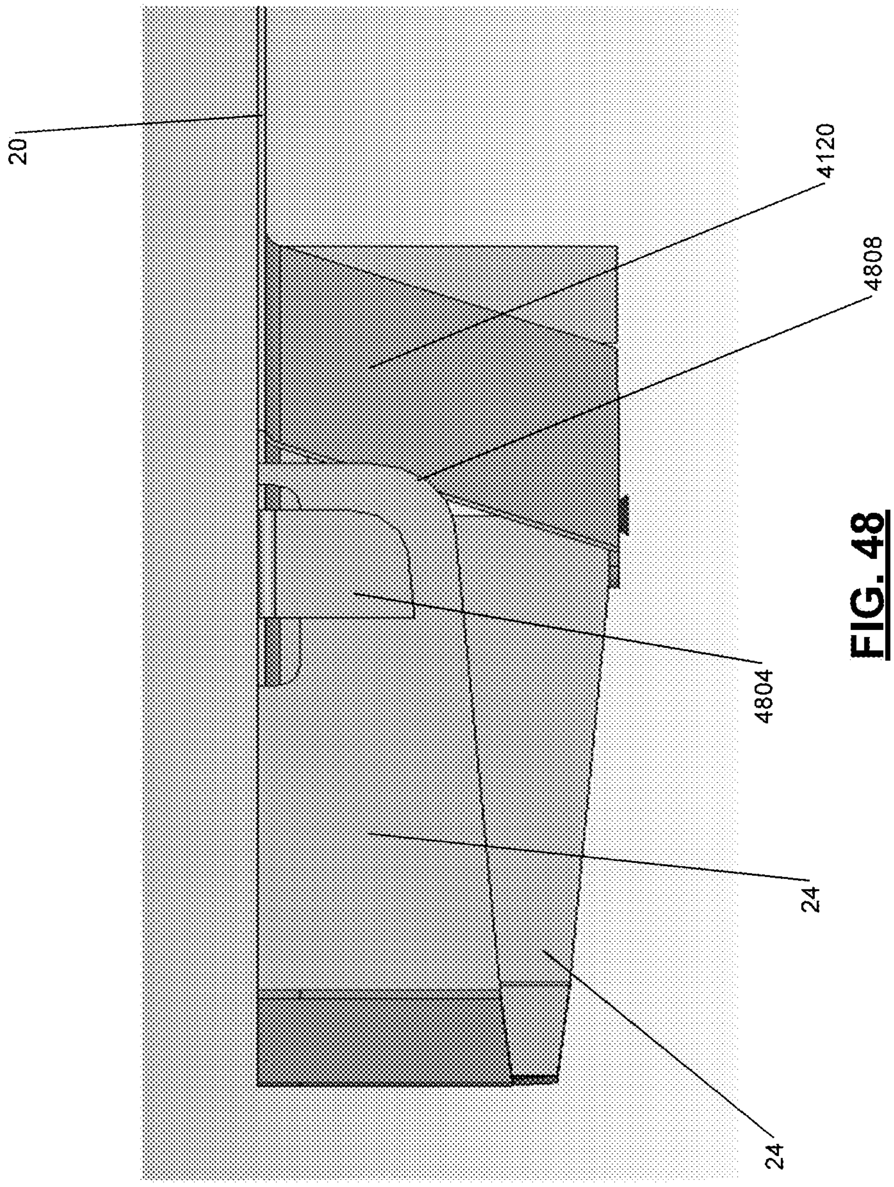
Figure 49:
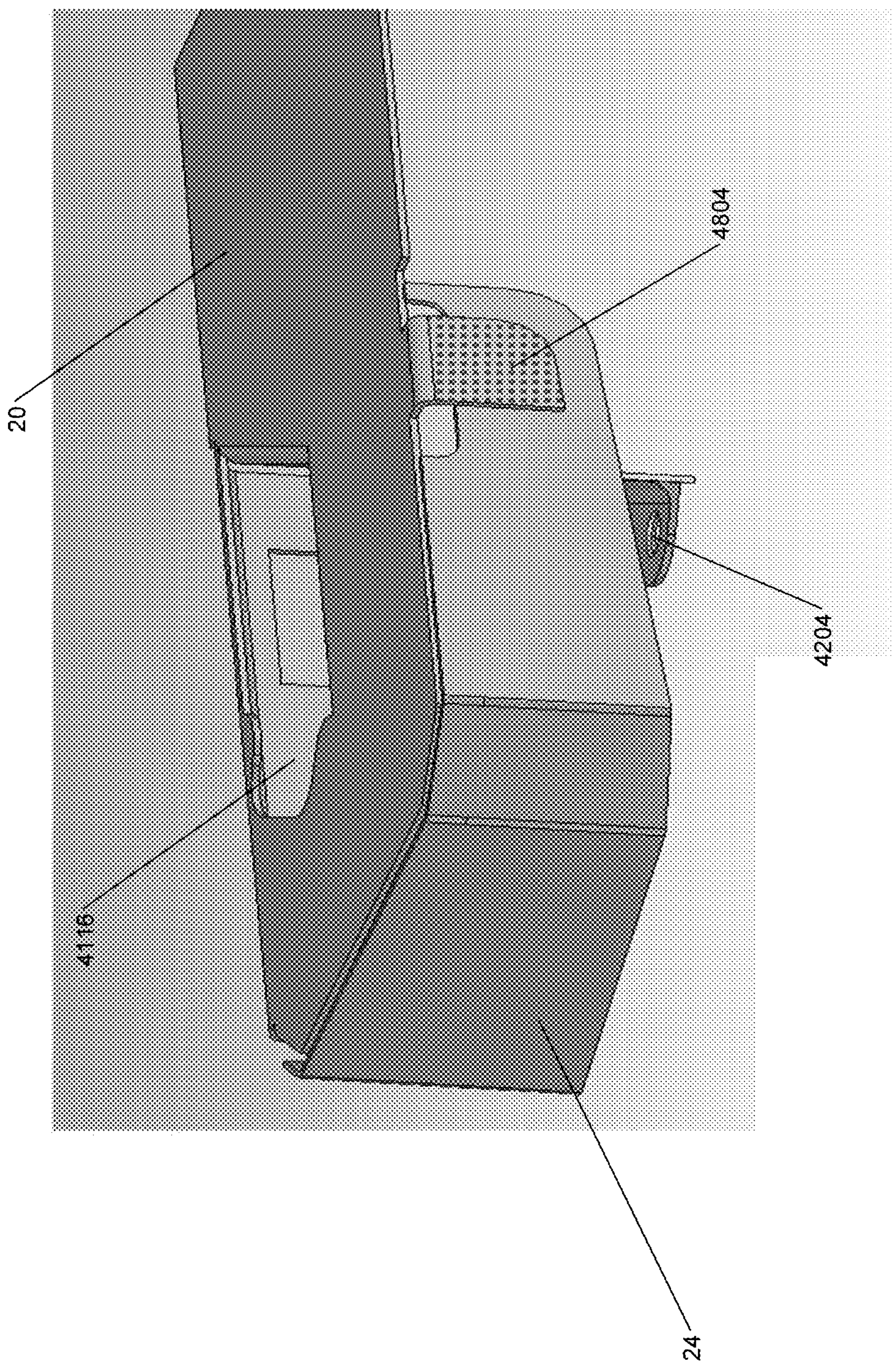

FIGS. 38-40 illustrate another example orientation of the circuit board 2104 and matching network 2108. In this example, the vias 2404 are electrically connected to the tapered side portion 24 to feed the UWB antenna.

In various implementations, such as in the example of FIG. 38, the plane of circuit board 2104 may be parallel to a plane of a portion of the tapered side portion 24. Conductor 3904 may contact and electrically connect to the ground plane. As illustrated, the bottom edge 3908 of the circuit board 2104 may be separated from the ground plane 3912 by air. In various implementations, the circuit board 2104 may be fixed to the tapered side portion 24 of the UWB antenna, such as by fasteners (e.g., screws), using an adhesive (e.g., electrically conductive), via soldering, or in another suitable manner.

FIGS. 41-49 include perspective views of an example implementation of a UWB antenna including a rectangular RF balun 4104. The UWB antenna is fed via 4108. One or more slots 4112 are formed between portions of the planar cap portion 20 and the tapered side portion 24. In this example, the tapered side portion 24 extends only partially (e.g., approximately half way) around the UWB antenna.

The planar cap portion 20 includes an aperture 4116 that is approximately the same side and shape as the ground connecting portion 4120 similar to the discussion above. The ground connecting portion 4120 may include one or more apertures 4204 via which the ground connecting portion 4120 can be fixed, such as to the ground plane (e.g., via fasteners). The UWB antenna 30 may also include one or more other apertures 4208 via which the UWB antenna can be fixed, such as to the ground plane (e.g., via a fastener). In various implementations, a tab 4804 may extend from the planar cap portion and be used to hold the tapered side portion 24 in position.

The ground connection portion 4120 may be disposed closer to the RF balun 4104 than to the end 4124 of the tapered portion 24. A width 4126 of the aperture 4116 may be within a predetermined percentage of a total width 428 of the planar cap portion 20 for antenna performance. The predetermined percentage may be, for example, 25-60 percent or 30-55 percent. In various implementations, the total width 4128 may be, for example, 60 millimeters or another suitable width. The width 428 may be measured perpendicularly to the lateral sides of the planar cap portion 20.

An angle 4220 between a fold line 4224 and an edge 4228 of the planar cap portion 20 may be within a predetermined angle range for antenna performance. The predetermined angle range may be, for example, between 90 and 165 degrees or 145 degrees+/−15 degrees.

The tapered side portion 24 may extend vertically downwardly toward the ground plane and may be perpendicular or non-perpendicular to the ground plane. For example only, the tapered side portions 24 may be +/−3-10 degrees from perpendicular to planar cap portion 20 and the ground plane.

Figure 50:
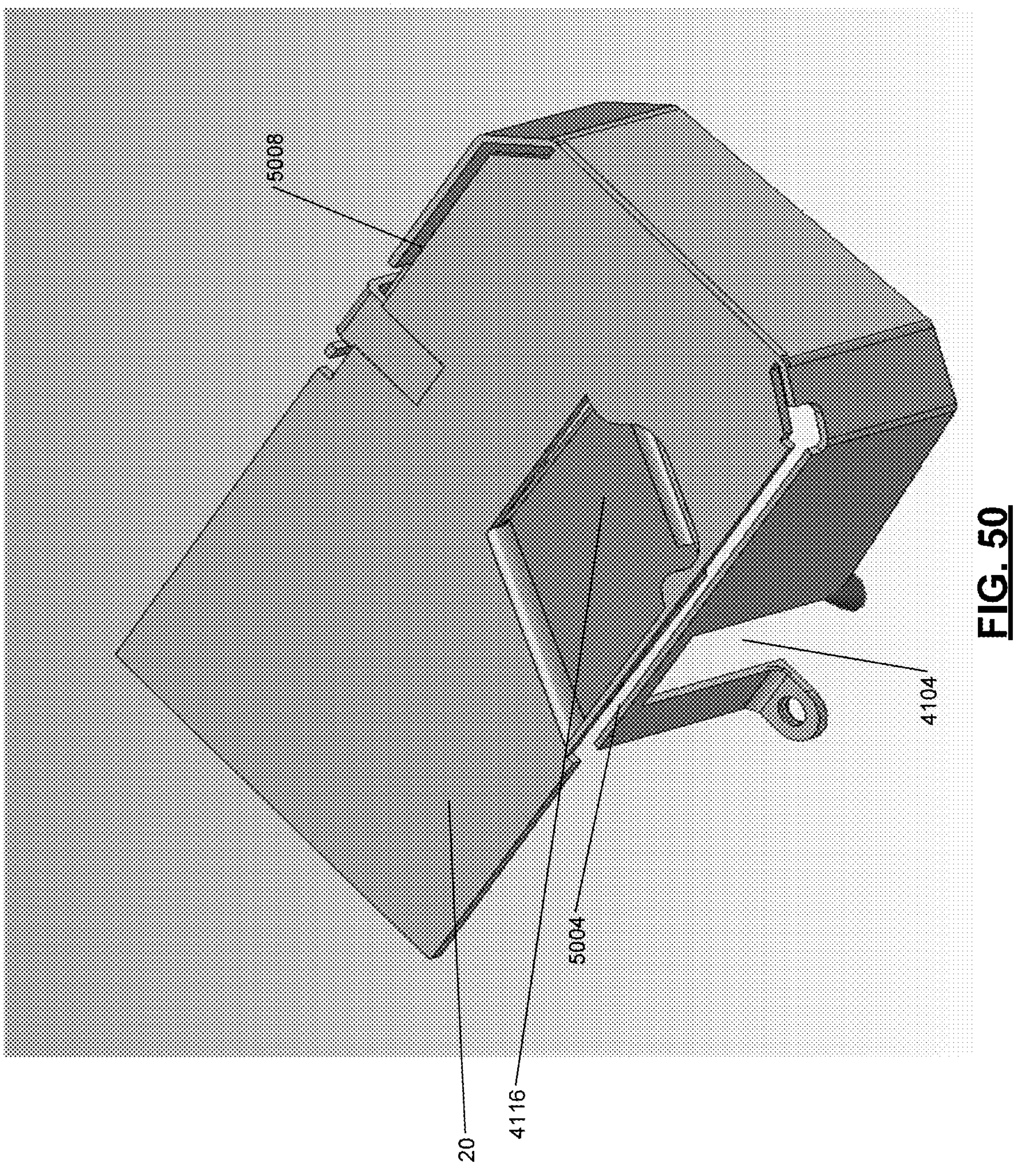
FIG. 50 includes a perspective view of an example implementation of a UWB including an RF balun.

In various implementations, the tab 4804 may extend through an aperture in the tapered side portion 24. In various implementations, the tab 4804 may directly contact the exterior or interior surface of tapered side portion 24. In various implementations, the end of the tapered side portion 24 may include a rounded edge 4808. As shown in FIG. 50, a slot 5004 may be disposed between the RF balun 4104 and the planar cap portion 20 and between the RF balun and the aperture 4116. A second slot 5008 may be disposed on an opposite side of the planar cap portion 20 as the slot 5004.

The UWB antennas described herein may have an operating frequency range, such as from 617 megahertz (MHz) to 6 gigahertz (GHz), although other frequency ranges may be used. The UWB antenna may be formed from a single piece of material and formed into a three dimensional (3D) shape. The UWB antenna is made of an electrically conductive material, such as aluminum.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The drawings provided herein may be to scale. Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. An ultra wide band (UWB) antenna formed from a single piece of material, the UWB antenna comprising:

a planar portion arranged above a ground plane;

an aperture through the planar portion;

a ground connecting portion formed from cutting of the aperture and configured to electrically connect the UWB antenna to the ground plane; and a tapered portion configured to be electrically connected to a feed, the tapered portion extending around at least 40 percent of a periphery of the planar portion and extending from the planar portion toward the ground plane, wherein a height of the tapered portion decreases around the periphery of the planar portion moving away from the feed, and wherein a lower edge of the tapered portion is spaced from the ground plane by a gap.

2. The UWB antenna of claim 1 further comprising a radio frequency (RF) balun.

3. The UWB antenna of claim 2 wherein the aperture is disposed closer to where the RF balun than a location of an end of the tapered portion.

4. The UWB antenna of claim 1 wherein a first width of the aperture is within a predetermined percentage of a second width of the planar portion.

5. The UWB antenna of claim 4 wherein the predetermined percentage is 25-60 percent.

6. The UWB antenna of claim 5 wherein the predetermined percentage is 30-55 percent.

7. The UWB antenna of claim 1 wherein the ground connecting portion includes an edge where the ground connecting portion is folded away from the planar portion and toward the ground plane.

8. The UWB antenna of claim 7 further comprising a radio frequency (RF) balun, wherein an angle between (a) the edge where the ground connecting portion is folded away from the planar portion and toward the ground plane and (b) a second edge of the planar portion adjacent to the RF balun is within a predetermined angle range.

9. The UWB antenna of claim 8 wherein the predetermined angle range is 90 to 165 degrees.

10. The UWB antenna of claim 8 wherein the predetermined angle range is 130 to 160 degrees.

11. The UWB antenna of claim 1 wherein the tapered portion extends toward the ground plane and is perpendicular to the ground plane and the planar portion.

12. The UWB antenna of claim 1 wherein the tapered portion extends toward the ground plane and is non-perpendicular to the ground plane and the planar portion.

13. The UWB antenna of claim 12 wherein at least one of the ground connecting portion and the tapered portion is 3 to 10 degrees from being perpendicular to the planar portion and the ground plane.

14. The UWB antenna of claim 1 further comprising:

a radio frequency (RF) balun; and a slot disposed between the RF balun and the planar portion.

15. The UWB antenna of claim 14 wherein the slot is disposed between the RF balun and the aperture.

16. The UWB antenna of claim 14 further comprising a second slot disposed on an opposite side of the planar portion as the slot.

17. The UWB antenna of claim 1, wherein the height of UWB antenna corresponds to approximately 1/20 of a wavelength corresponding to a target lowest operating frequency of the UWB antenna.

18. The UWB antenna of claim 1, wherein the height of the tapered portion monotonically decreases moving away from the feed.

19. The UWB antenna of claim 1 wherein the planar portion, the ground connecting portion, and the tapered portion are made of an electrically conductive material.

20. A vehicle comprising the UWB antenna of claim 1.

* * * * *